(12) United States Patent
Walker et al.

(10) Patent No.: US 10,289,096 B2
(45) Date of Patent: May 14, 2019

(54) COMPUTER CONTROLLED WORK TOOL APPARATUS AND METHOD

(71) Applicant: Zeeko Limited, Coalville (GB)

(72) Inventors: David Walker, Coalville (GB); Anthony Beaucamp, Coalville (FR); Christina Reynolds Dunn, West Lafayette, IN (US)

(73) Assignee: Zeeko Limited, Coalville (GB)

( * ) Notice: Subject to any disclaimer, the term of this patent is extended or adjusted under 35 U.S.C. 154(b) by 0 days.

(21) Appl. No.: 15/920,664

(22) Filed: Mar. 14, 2018

(65) Prior Publication Data

US 2018/0203432 A1    Jul. 19, 2018

Related U.S. Application Data

(62) Division of application No. 12/674,952, filed as application No. PCT/GB2008/002890 on Aug. 26, 2008, now Pat. No. 9,952,585.

(30) Foreign Application Priority Data

Aug. 24, 2007  (GB) .................................. 0716597.0

(51) Int. Cl.
*G06F 19/00* (2018.01)
*G05B 19/4099* (2006.01)
(Continued)

(52) U.S. Cl.
CPC .......... *G05B 19/4099* (2013.01); *B24B 13/06* (2013.01); *B24D 13/142* (2013.01);
(Continued)

(58) Field of Classification Search
CPC .............. G05B 19/408; G05B 19/4067; G05B 19/4097; G05B 19/414; G05B 19/4103;
(Continued)

(56) References Cited

U.S. PATENT DOCUMENTS 3,676,960 A    7/1972  Aspden
4,789,931 A *  12/1988 Kuragano .......... G05B 19/4099
                                                    318/572
(Continued)

FOREIGN PATENT DOCUMENTS

GB    2433906 A    7/2007
GB    2452091 B    1/2013
(Continued)

OTHER PUBLICATIONS

Beaucamp et al., "Metrology Software Support for Free-Form Optics Manufacturing", "http://www.zeeko.co.uk/papers/Chubu_Metrology_Paper_2007.pdf", Jan. 31, 2007, pp. 1-7, Publisher: Zeeko.
(Continued)

Primary Examiner — Ronald D Hartman, Jr
(74) Attorney, Agent, or Firm — Fogg & Powers LLC

(57) ABSTRACT

A polishing machine is described in which a surface treatment tool is moved across the surface of a workpiece in accordance with a predefined tool-path, in order to carry out the desired treatment process. The tool-path is non-periodic and preferably pseudo-random. Various techniques are described for generating data representing the tool-path to be followed. A technique is also described for determining optimum control parameters used to control the polishing machine for a given tool-path. The surface treatment may be a shaping technique in which material is removed from the surface, or a technique for adding material to the surface of the workpiece, or a technique for modifying the surface or a region under the surface of the workpiece.

48 Claims, 11 Drawing Sheets

(51) Int. Cl.
  *B24B 13/06* (2006.01)
  *G05B 19/4103* (2006.01)
  *B24D 13/14* (2006.01)

(52) U.S. Cl.
  CPC ............... *G05B 19/4103* (2013.01); *G05B 2219/34105* (2013.01); *G05B 2219/34118* (2013.01); *G05B 2219/34141* (2013.01); *G05B 2219/35122* (2013.01); *G05B 2219/45157* (2013.01); *G05B 2219/45199* (2013.01); *G05B 2219/45232* (2013.01); *G05B 2219/49352* (2013.01)

(58) Field of Classification Search
  CPC .......... G05B 19/41; G05B 2219/50109; G05B 19/40937
  See application file for complete search history.

(56) References Cited

U.S. PATENT DOCUMENTS

| | | | |
|---|---|---|---|
| 5,338,915 A | | 8/1994 | Hildebrand et al. |
| 5,363,308 A * | | 11/1994 | Guyder .............. G05B 19/4099 318/570 |
| 5,440,216 A * | | 8/1995 | Kim ........................ A47L 5/28 15/319 |
| 6,210,259 B1 * | | 4/2001 | Malkin .................. B24B 37/08 451/166 |
| 6,311,100 B1 * | | 10/2001 | Sarma ................ G05B 19/4097 700/186 |
| 6,591,158 B1 * | | 7/2003 | Bieterman ............. G05B 19/41 700/169 |
| 7,287,939 B2 * | | 10/2007 | Koch ................... G05B 19/182 29/889.7 |
| 7,451,013 B2 * | | 11/2008 | Coleman .......... G05B 19/40937 700/159 |
| 8,694,149 B2 * | | 4/2014 | Diehl ............... G05B 19/40937 409/132 |
| 2005/0235451 A1 * | | 10/2005 | Yan ........................ A47L 9/009 15/319 |
| 2006/0161318 A1 * | | 7/2006 | Aldred ................ G05D 1/0227 701/23 |
| 2008/0184518 A1 * | | 8/2008 | Taylor .................... A47L 9/009 15/319 |
| 2008/0203072 A1 * | | 8/2008 | Hedenfalk ........... B23K 9/0216 219/124.1 |
| 2011/0190922 A1 | | 8/2011 | Walker et al. |
| 2013/0297064 A1 * | | 11/2013 | Sherbrooke ............ B23Q 15/22 700/190 |

FOREIGN PATENT DOCUMENTS

| | | |
|---|---|---|
| WO | 1990014633 A1 | 11/1990 |
| WO | 2000007230 A1 | 2/2000 |
| WO | 2000032353 A2 | 6/2000 |
| WO | 2009027664 A1 | 3/2009 |

OTHER PUBLICATIONS

Cox et al., "Space-Filling Curves in Tool-Path Applications", "8340 Computer-Aided Design", Mar. 26, 1994, pp. 215-224, vol. 26, No. 3, Publisher: Butterworth-Heinemann Ltd., Published in: Jordan Hill, Oxford, GB.

Elber et al., "Toolpath Generation for Freeform Surface Models", "8340 Computer-Aided Design", Jun. 26, 1994, pp. 490-496, vol. 26, No. 6, Publisher: Butterworth-Heinemann Ltd, Published in: Jordan Hill, Oxford, GB.

International Searching Authority, "International Search Report for PCT Application No. PCT/GB2008/002890", "Foreign Counterpart to U.S. Appl. No. 12/674,952" dated Jan. 13, 2009, pp. 1-4, Published in: WO.

Marshall et al., "A New Cutter-Path Topology for Milling Machines", "8340 Computer-Aided Design", Mar. 26, 1994, pp. 204-214, vol. 26, No. 3, Publisher: Butterworth-Heinemann LTD., Published in: Jordan Hill, Oxford, GB.

United Kingdom Intellectual Property Office, "Patents Act 1977, Examination Report under Section 18(3) for GB Application No. GB0716597.0", Foreign Counterpart to U.S. Appl. No. 15/920,664, dated Dec. 12, 2011, pp. 1-2, Published in: UK.

United Kingdom Intellectual Property Office, "Patents Act 1977, Search and Examination Report under Sections 17 & 18(3) for GB Application No. GB0716597.0", Foreign Counterpart to U.S. Appl. No. 15/920,664, dated Oct. 30, 2012, pp. 1-2, Published in: UK.

United Kingdom Intellectual Property Office, "Patents Act 1977: Patents Rules 2007, Notification of Grant: Patent Serial No. GB2452091 for Patent Application No. GB0716597.0", Foreign Counterpart to U.S. Appl. No. 15/920,664, dated Dec. 4, 2012, pp. 1-2, Published in: UK.

United Kingdom Intellectual Property Office, "Patents Act 1977: Search Report under Section 17 for GB Application No. GB0716597.0", Foreign Counterpart to U.S. Appl. No. 15/920,664, dated Nov. 15, 2007, pp. 1-2, Published in: UK.

United States Patent and Trademark Office, "Final Office Action for U.S. Appl. No. 12/674,952", dated Feb. 26, 2016, pp. 1-5, Published in: US.

United States Patent and Trademark Office, "Notice of Allowance for U.S. Appl. No. 12/674,952", dated Dec. 18, 2017, pp. 1-5, Published in: US.

United States Patent and Trademark Office, "Office Action for U.S. Appl. No. 12/674,952", dated May 21, 2015, pp. 1-7, Published in: US.

United States Patent and Trademark Office, "Office Action for U.S. Appl. No. 12/674,952", dated Jun. 1, 2017, pp. 1-7, Published in: US.

United States Patent and Trademark Office, "Office Action for U.S. Appl. No. 12/674,952", dated Aug. 24, 2016, pp. 1-5, Published in US.

United States Patent and Trademark Office, "Office Action for U.S. Appl. No. 12/674,952", dated Oct. 21, 2014, pp. 1-12, Published in: US.

United States Patent and Trademark Office, "Restriction Requirement for U.S. Appl. No. 12/674,952", dated Dec. 24, 2013, pp. 1-10, Published in: US.

Walker et al., "Active Control of Edges and Global Microstructure on Segmented Mirrors", "Proceedings of the SPIE—Advanced Optical and Mechanical Technologies in Telescopes and Instrumentation", Jun. 23, 2008, pp. 1-9, Publisher: SPIE.

Walker et al., "Use of the Precessions (tm) Process for Prepolishing and Correcting 2D and 2 1/2D Form", "Optics Express", "http://www.opticsinfobase.org", Nov. 27, 2006, vol. 14, No. 24, pp. 1-9, Publisher: Optical Society of America.

* cited by examiner

COMPUTER CONTROLLED WORK TOOL APPARATUS AND METHOD

This Application is a Divisional Application claiming the benefit of, and priority to, U.S. patent application Ser. No. 12/674,952 titled "COMPUTER CONTROLLED WORK TOOL APPARATUS AND METHOD", which is a 371 National Stage Application of International Application No. PCT/GB08/02890 titled "COMPUTER CONTROLLED WORK TOOL APPARATUS AND METHOD" filed on Aug. 26, 2008, which claims priority to United Kingdom Patent Application No. GB 0716597.0 titled "COMPUTER CONTROLLED WORK TOOL APPARATUS AND METHOD" filed on Aug. 24, 2007, each of which are incorporated by reference in their entirety.

The present invention generally relates to methods and apparatus for performing surface treatments, and is principally concerned with computer controlled work tools and methods for working on or under the surface of a workpiece. The invention has particular, although not exclusive, relevance to polishing machines and the like for abrading or polishing the surface of a workpiece. The workpiece surface may be a curved or flat surface of an optical component such as a lens or a mirror, or a screen component for a display device. The invention further has utility in the levelling and polishing of silicon wafers prior to the manufacture of semiconductor devices from the wafers by conventional production techniques. Aspects of the invention have utility in other fields, to provide techniques of addressing or treating all parts of an extended surface area using a localised treatment device while avoiding the creation of treatment artefacts over the extended surface.

The abrading or polishing of a surface of a workpiece is a technique which has applications in many different fields including the production of semi-conductor devices and optical components such as optical lenses. The requirement is to provide a surface which has a particular surface contour and a particular surface finish (e.g. smoothness). In the field of optical polishing there are two different techniques. One technique uses a tool for polishing which has a size similar to the size of the workpiece. The limitation of this technique is that the tool is designed for a specific workpiece and thus cannot be used universally.

In the second technique, the tool is substantially smaller than the workpiece and is moved across the workpiece in accordance with a predefined tool-path, in order to carry out the abrading or polishing process. Such a technique is described in U.S. Pat. No. 4,128,968 and in WO 00/32353. In these prior art systems, the tool is moved across the workpiece in accordance with a raster or spiral tool-path. Depending on the difference between the actual surface profile of the workpiece and the desired surface profile, the characteristics of the toolhead are varied (e.g. pressure applied, speed of travel, dwell time etc.) in order to obtain the desired surface profile.

The inventors, however, have identified that such a regular or periodic tool-path creates rows of grooves and/or ridges resembling a diffraction grating in the surface of the workpiece.

According to one aspect, the present invention provides a method and apparatus for performing a surface treatment on an area, by moving a surface treatment device along an irregular path which visits all points of the area. Preferably the path is a random or pseudo-random path. More preferably, the path visits all points of the area without visiting any point twice. Most preferably, the distance between neighbouring stretches of the path is arranged to be within a predetermined range of distances. In one embodiment, the path is arranged so that the distance between neighbouring stretches of the path is substantially the same for all or substantially all points on the path. In another embodiment, the path is arranged so that the distance between neighbouring stretches of the path is reduced at some points along the length of the path as compared to other points. Particularly, the surface treatment may be controlled accurately when the distance between neighbouring stretches of the path is reduced, and the tool footprint is correspondingly reduced. Such accurate control is particularly beneficial in areas adjacent the edge of the workpiece.

The degree of treatment performed on an area of the workpiece may be varied by varying the speed of movement of the tool along the tool path in order to vary the dwell time of the tool at different points along the tool path. In an area where more treatment is required, the speed of the tool along the tool path is reduced at points on the tool path which are within the area requiring more treatment. Alternatively, the tool may be moved at a constant speed along the tool path and the "packing density" of the tool path (i.e. the spacing between neighbouring stretches of the tool path) may be increased in the area where more treatment is required. In a further alternative, control of the degree of treatment to which the workpiece is subjected in a particular area may be affected using a combination of these two techniques, i.e. by varying the speed of movement of the tool along the tool path, and by varying the "packing density" of the tool path over the surface area to be treated. In a yet further alternative, a variation of packing density may be combined with a variation in influence function. For example, a closer packing-density may be combined with a narrower influence function (smaller tool footprint), where it is required to minimise effects of edge-roll.

In one embodiment, measurements are taken at a plurality of points on the surface, and an error map is generated to show a difference between the actual measured surface and the required or target surface at each point on the surface to be treated. The influence function of the tool is then varied as the tool travels across the surface, so that at each point on the surface the error between the actual surface and the target surface is reduced to below a threshold value.

In an alternative embodiment, the tool is moved over the workpiece surface following the tool path, keeping the influence function of the tool substantially constant so that each part of the surface receives substantially the same treatment. When a variation in the amount of treatment delivered at different areas of the workpiece surface is required, this may be achieved using a tool of constant influence function by varying the "packing density" of the tool path, to reduce the spacing between neighbouring stretches of the tool path in areas where more surface treatment is required.

A second aspect of the invention provides a computer-controlled tool for working on or under the surface of a workpiece by moving a surface treatment tool over the surface along a predefined tool-path which is non-periodic and which visits all points of the area. In one embodiment, the tool-path is substantially random (pseudo-random) and generated using, for example, an artificial ant or a maze algorithm. In a preferred embodiment, the tool-path does not cross itself which facilitates the control of controllable characteristics of the tool as it is passed over substantially the entire surface of the workpiece being worked.

This aspect of the invention can be applied to a variety of different types of computer-controlled work tools which are used for finishing the surface of a workpiece. For example, it can be applied to systems where the tool removes material from the surface of the workpiece (such as by grinding or polishing), or to tools which add material to the surface of the workpiece (such as by plating or coating). This aspect of the invention also applies to tools which modify the surface (or a region under the surface) of the workpiece chemically or physically (e.g. hardening, ion-implantation, radioactive bombardment etc.) or to a tool which can be used to perform any combination of: adding material to, removing material from, or modifying the chemical or physical structure of the workpiece.

The invention also relates to an apparatus and method for generating an irregular path which addresses all parts of an extended surface. Preferably the path is a random or pseudo-random path. More preferably, the path visits all points of the area without visiting any point twice. The distance between neighbouring stretches of the path may be arranged to be within a predetermined range of distances. In one embodiment, the path is arranged so that the distance between neighbouring stretches of the path is substantially the same for all or substantially all points on the path. In an alternative embodiment, however, the path is arranged so that the distance between neighbouring stretches of the path is varied at points along the path. In a particular embodiment, the distance between neighbouring stretches of the path is reduced in areas adjacent the edge of the extended surface. The path may be used as a tool-path for use in the machines referred to above, or may be used as a locus for sequentially addressing locations on a surface in a substantially random manner.

These and various other aspects and features of the invention will become apparent from the following exemplary embodiments which are described in detail with reference to the accompanying figures in which:

FIG. 1 is a perspective view of a polishing apparatus using a tool which is moved over the surface of the workpiece;

FIG. 2a schematically illustrates one way in which the tool may be arranged to polish the surface of the workpiece;

FIG. 2b schematically illustrates an alternative arrangement of the tool for polishing the surface of the workpiece;

Figure 3:
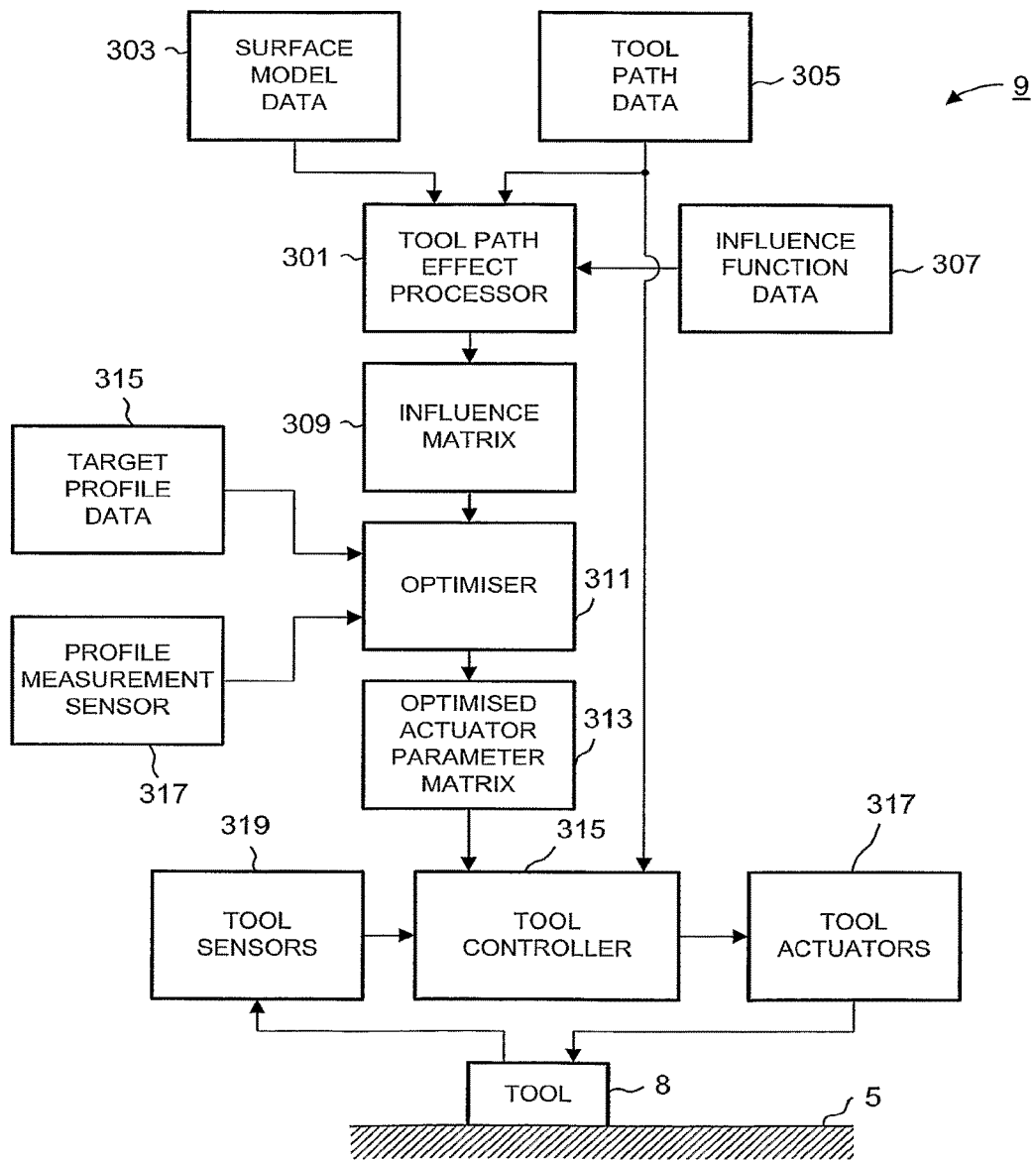
FIG. 3 is a schematic block diagram illustrating the main components of the computer-controlled tool used for polishing the surface of the workpiece.
Figure 4A:
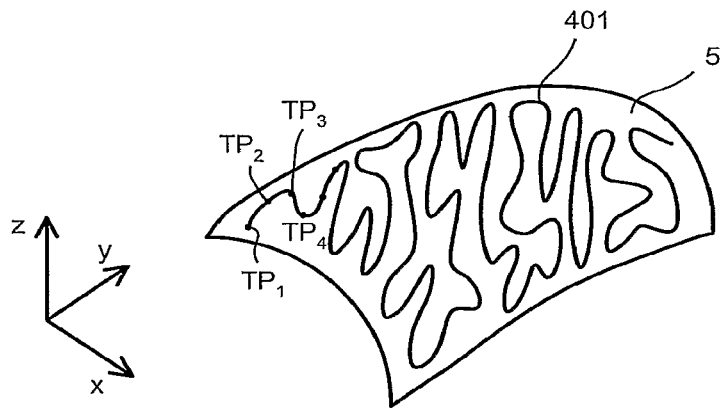
Figure 4B:
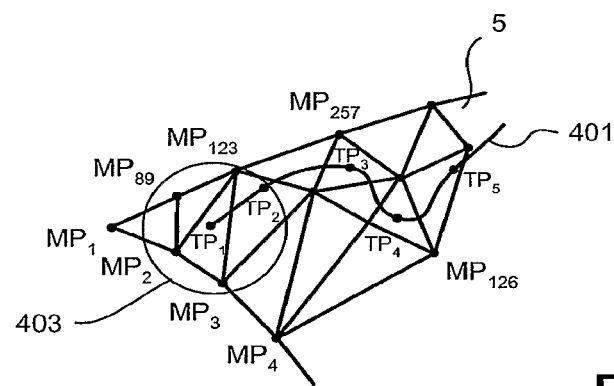
Figure 4C:
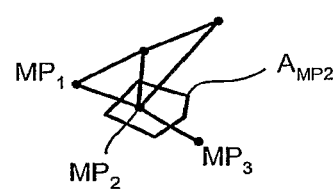
Figure 5:
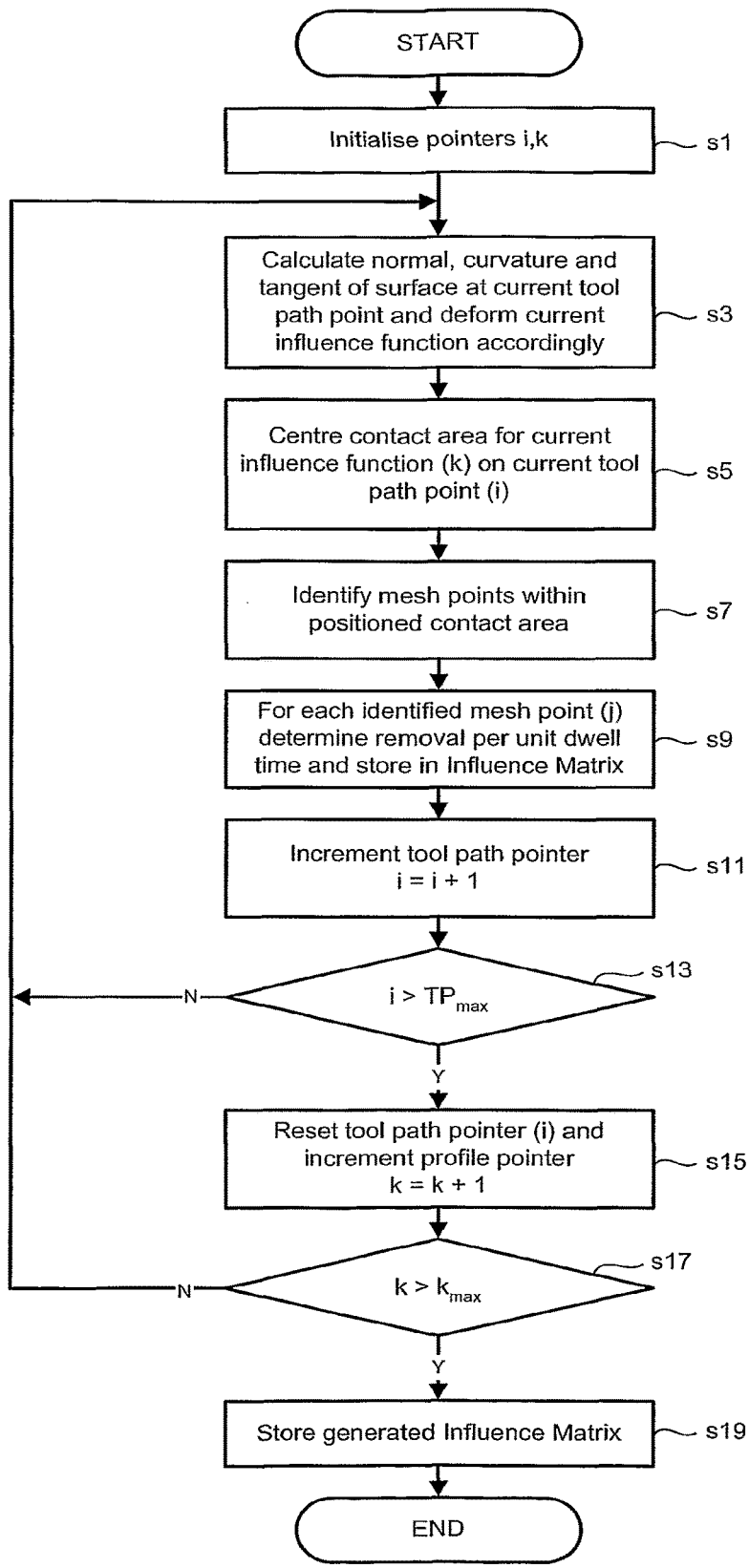
Figure 6:
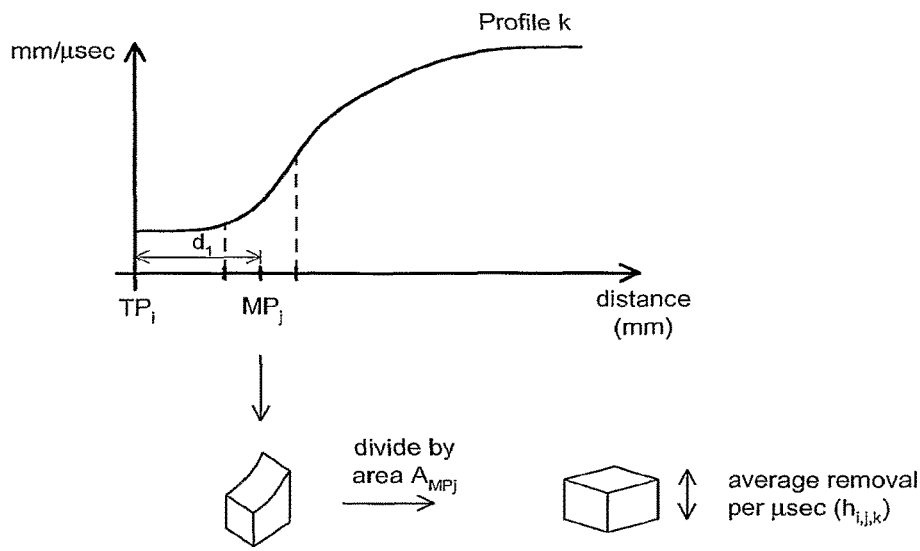
Figure 7:
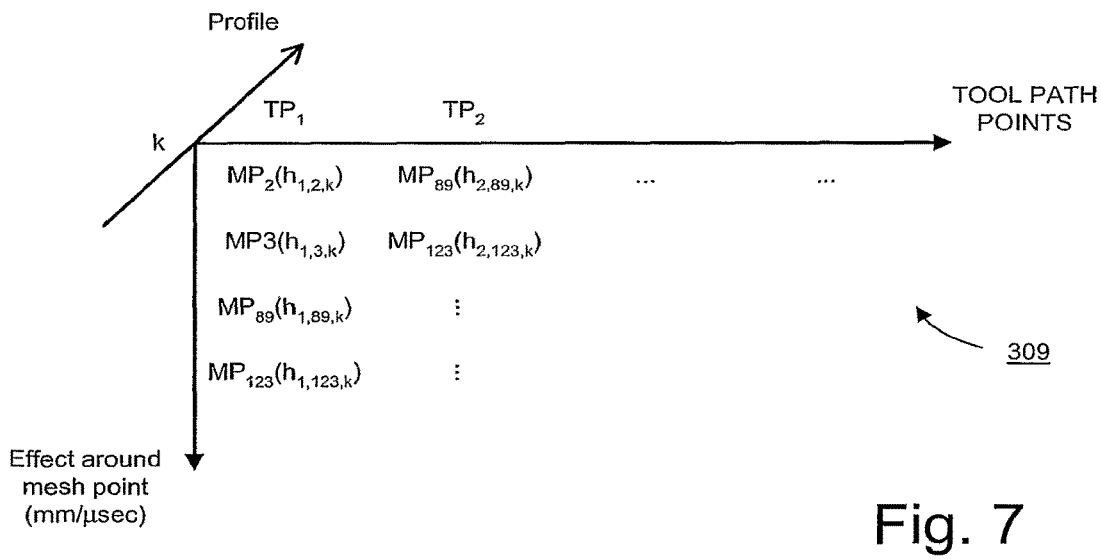
Figure 8:
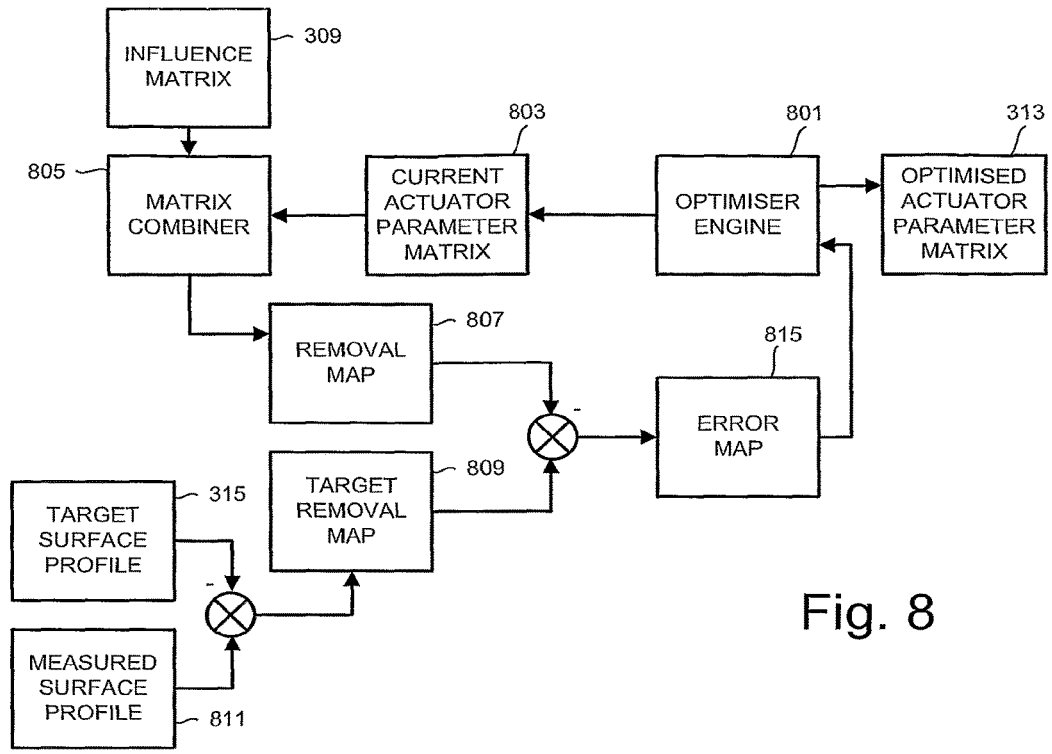
Figure 9:
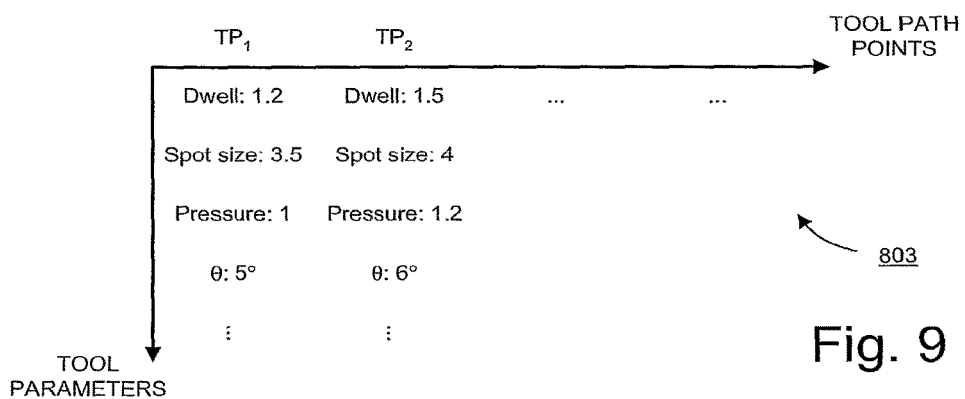
Figure 10:
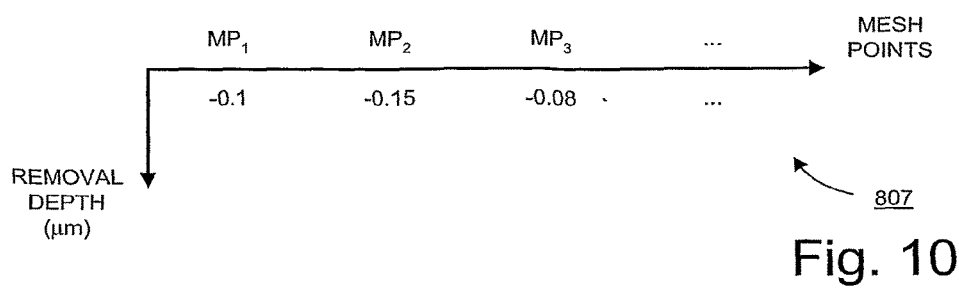
Figure 11:
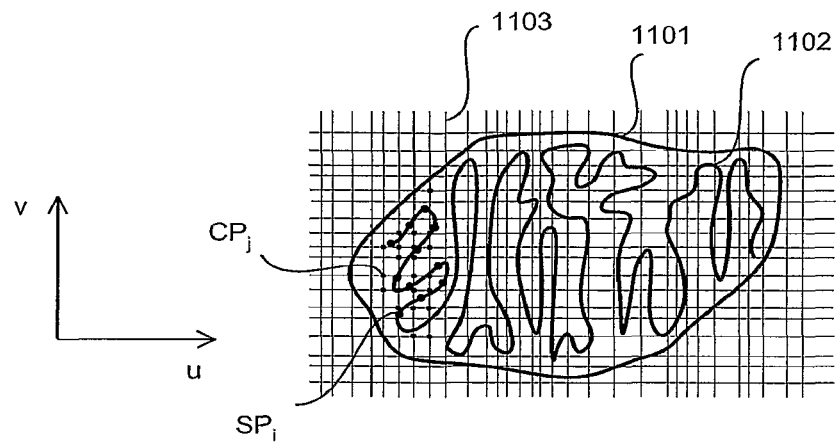
Figure 12:
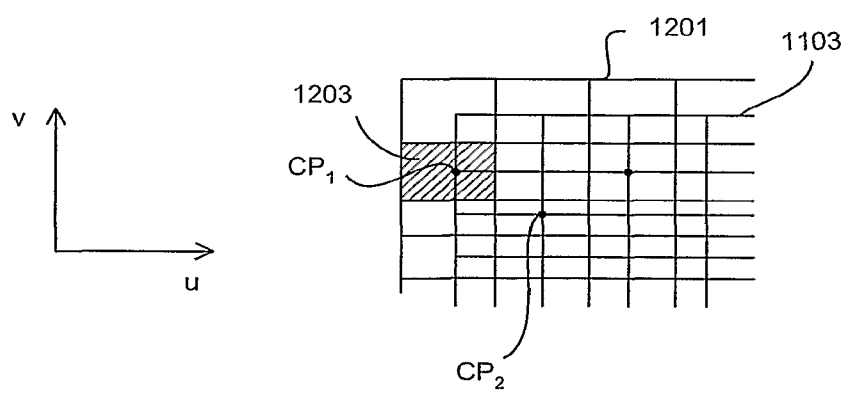
Figure 13:
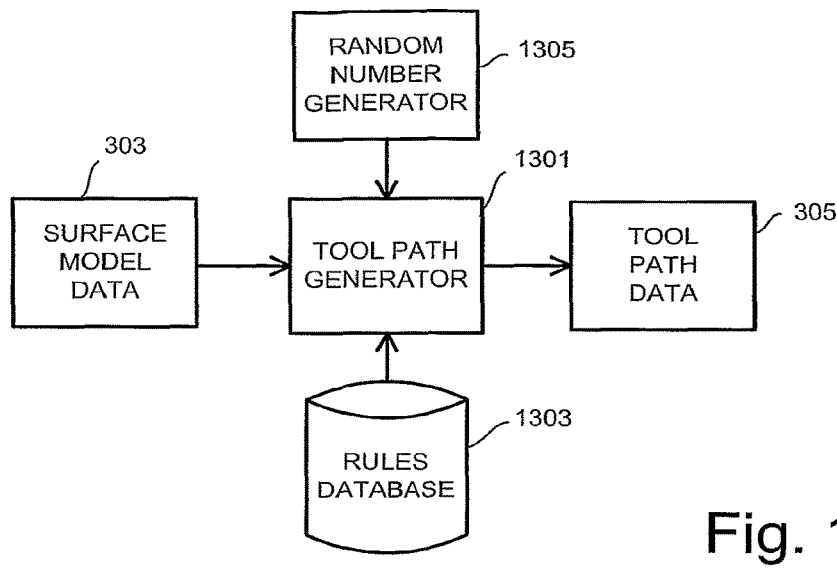
Figure 14A:
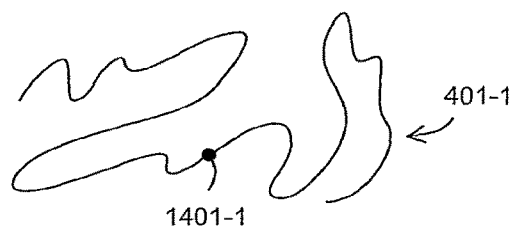
Figure 14A:
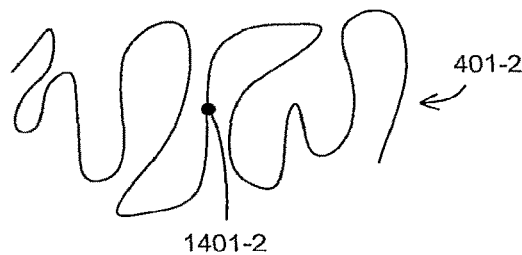
Figure 14B:
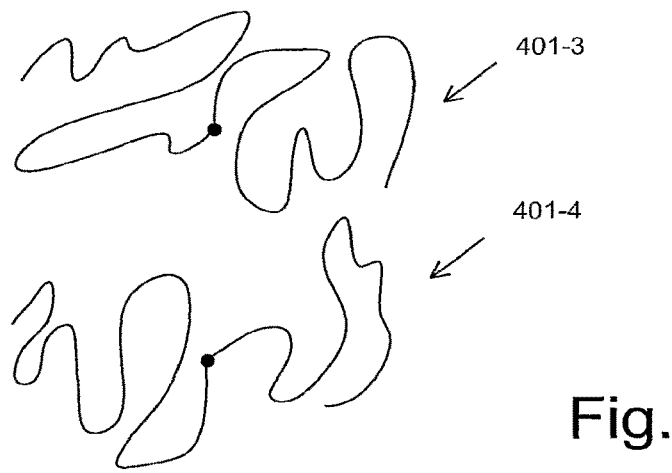
Figure 15:
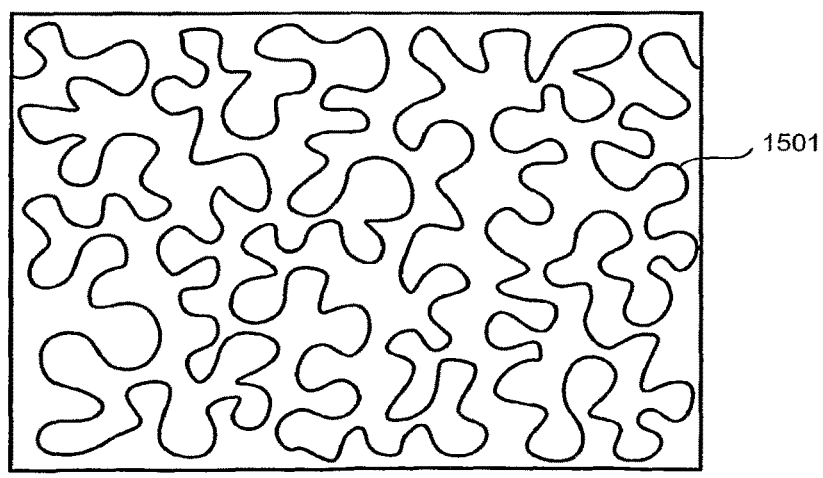

FIG. 4a schematically illustrates the surface of the workpiece to be worked and illustrating a non-periodic tool-path along which the tool is to be moved relative to the workpiece;

FIG. 4b illustrates in more detail part of the tool-path shown in FIG. 4a and illustrating a mesh of points arrayed over a model of the surface of the workpiece, which is used in the calculations performed by the tool-path effect processor;

FIG. 4c illustrates in more detail some of the mesh points shown in FIG. 4b and illustrating an area that is associated with a mesh point;

FIG. 5 is a flowchart illustrating the way in which a tool-path effect processor determines an influence matrix defining the influence of the tool on the workpiece for a given tool-path;

FIG. 6 schematically illustrates the form of a selected tool profile and illustrates some of the calculations carried out by the tool-path effect processor shown in FIG. 3;

FIG. 7 schematically illustrates the form of the influence matrix generated by the tool-path effect processor shown in FIG. 3;

FIG. 8 is a schematic block diagram illustrating in more detail the main components of an optimiser which forms part of the system shown in FIG. 3;

FIG. 9 illustrates the form of an actuator parameter matrix that is to be optimised by the optimiser shown in FIG. 8;

FIG. 10 illustrates the form of a removal map that is calculated by the optimiser using the influence matrix generated by the tool-path effect processor and a current actuator parameter matrix;

FIG. 11 illustrates the surface profile of the workpiece when represented by two-dimensional parametric curves;

FIG. 12 illustrates a number of the control points for the workpiece illustrated in FIG. 11 and the areas associated with the control points;

FIG. 13 is a block diagram illustrating the main components of a tool-path generator used to generate the tool-path data that defines the tool-path along which the tool is to be moved relative to the surface of the workpiece;

FIG. 14a schematically illustrates two candidate paths and a cutting point at which the two candidate paths are cut into two segments;

FIG. 14b schematically illustrates two new candidate paths generated by splicing together different segments from the two candidate paths shown in FIG. 14a;

FIG. 15 illustrates the form of an exemplary stippling pattern; and

Figure 16:
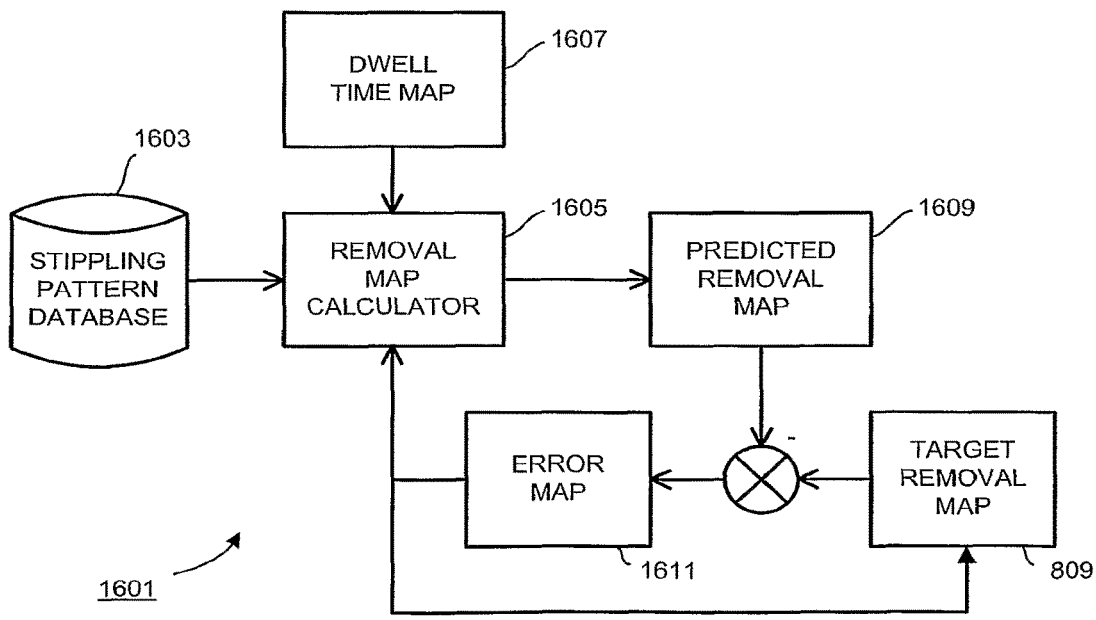

FIG. 16 illustrates the main components of an alternative tool-path generator used to define tool-paths based on one or more stippling patterns obtained from a stippling pattern database.

FIRST EMBODIMENT

Overview

Figure 1:
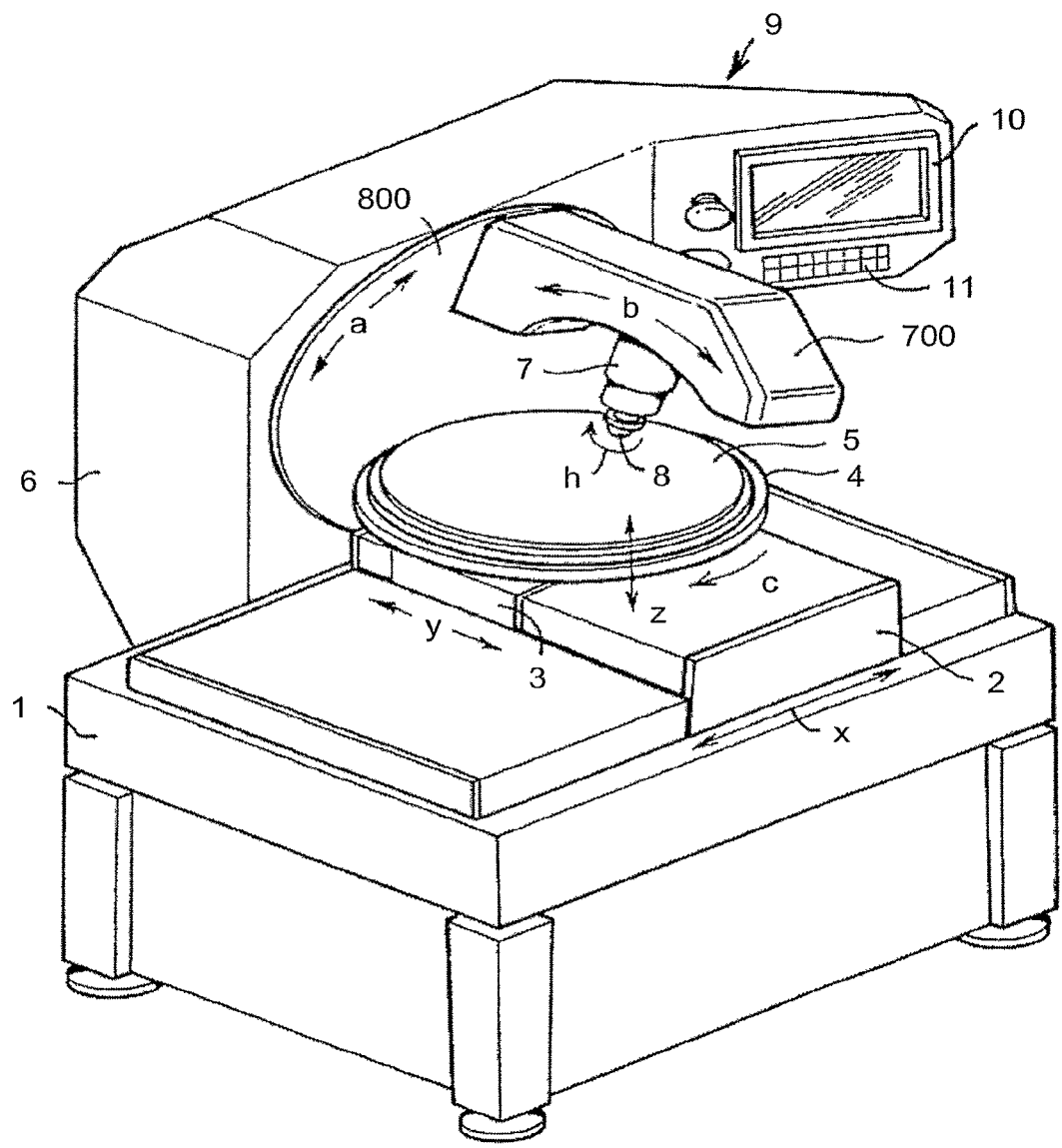

FIG. 1 is a perspective diagram of a polishing machine according to one embodiment of the present invention. The polishing machine comprises a table 1 which is resistant to vibrations. On the table 1 there is mounted an X-slide mechanism 2 for movement in the x-direction. On the X-slide mechanism 2 there is mounted a Y-slide mechanism 3 for movement in the y-direction. On the Y-slide mechanism 3 there is mounted a turntable 4 for rotation in the direction indicated by arrow c. The turntable 4 is mounted on the Y-slide mechanism 3 via a Z-movement mechanism (not shown) for movement of the turntable 4 in the z-direction. The turntable 4 has a support surface onto which a workpiece 5 is mounted and held for polishing or abrading. Thus, this arrangement provides for motion of the workpiece 5 in four axes—namely x, y, z and c.

The polishing machine is also provided with a back member 6 on which is mounted a pivot arrangement for pivotally moving a polishing head 7. The polishing head 7 is arranged for axial rotation and includes a working member (or tool) 8 arranged at a lower axial end for polishing or abrading the workpiece 5. Thus axial rotation of the working member 8 provides another axis for control, namely h.

The pivot mechanism mounted on the back member 6 comprises a first pivot member 700 mounted in an arm for pivoting the head about a pivot point in the working member 8 in a first plane. The first pivot mechanism 700 is mounted on a second pivot mechanism 800 which provides for the pivoting of the head 7 about a pivot point in a plane perpendicular to the plane of pivoting of the first pivot mechanism 700 in the arm. Thus these two orthogonal pivoting mechanisms provide two further axes of control, namely a and b.

The back member 6 of the polishing machine also houses a computer control system 9 which includes a display 10 and control inputs 11. This allows a user to input controls to control the motion of the workpiece 5 and of the tool 8 and to view displayed information regarding the polishing or abrading process.

Each of the axes of motion x, y, z, c, h, a and b are driven by respective drive actuators (not shown). Sensors (not shown) are also provided for sensing the position of the actuators to provide position information for use by the computer control system 9 to control the polishing or abrading process. The computer control system 9 is also provided with two further axes of control: namely the work done by the driving mechanism in rotating the tool 8 held in the head 7 and the pressure applied within the tool 8. Thus, the computer control system 9 operates an algorithm to control these nine axes (or parameters) in order to abrade or polish the workpiece 5 mounted on the turntable 4, to achieve the desired surface profile and/or surface quality (such as smoothness). As will be apparent to those skilled in the art, the polishing machine can be used to achieve any desired surface profile including a surface profile containing both concave and convex areas.

As will be described in more detail below, in this embodiment, the computer control system 9 is arranged to control the movement so that the tool 8 is arranged to follow a pseudo-random tool-path over the surface of the workpiece 5 and controls the amount of polishing over the surface by: (i) varying the time spent at each point along the tool-path (the dwell time), (ii) varying the transverse speed along the tool-path, and/or (iii) varying the rate of working of the tool 8. As a result of the use of a pseudo-random tool-path, polishing artefacts that are generated using a periodic spiral or raster tool-path can be avoided.

Figure 2A:
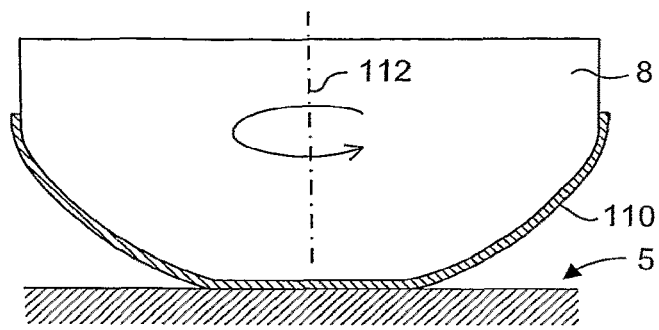
FIG. 2c is a graph illustrating the removal profiles of the tool for the orientations shown in FIGS. 2a and 2b.
FIG. 2d illustrates the removal profiles for the tool for different operating characteristics of the tool.
Figure 2B:
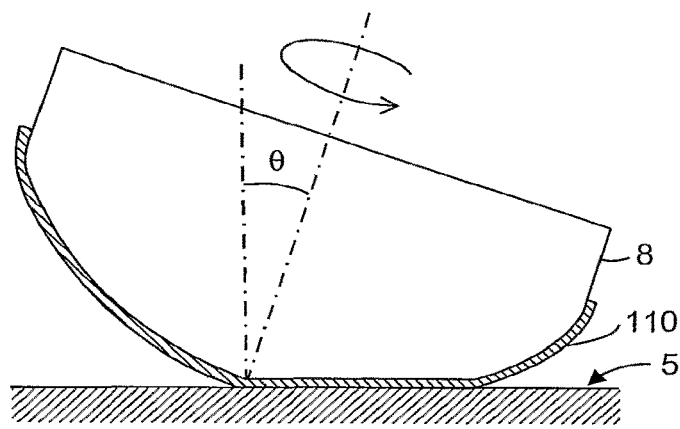

FIG. 2a schematically illustrates the surface of the workpiece 5 and the tool 8 used in this embodiment. As shown, in this embodiment the tool 8 has a sheet of soft (deformable) polishing material 110 attached to its end. To achieve the polishing, the polishing material 110 is brought down into contact with the surface of the workpiece 5 and the tool 8 is rotated about its axis 112. In the illustration of FIG. 2a, the tool 8 is oriented so that its axis 112 lies normal to the surface of the workpiece 5. Alternatively, as illustrated in FIG. 2b, the polishing machine may be arranged to present the tool 8 at an angle (θ) to the surface normal.

Figure 2C:
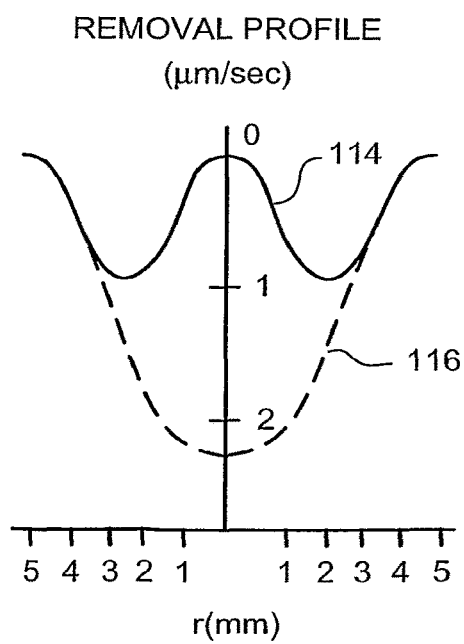

As a result of the rotation of the tool 8, the polishing material 110 polishes (i.e. removes material from) the area of the workpiece 5 with which it is in contact. The amount of material removed within this area of contact is not uniform and depends, among other things, on the angle θ. The amount of material removed also depends on the time that the polishing material polishes the contact area. FIG. 2c illustrates, with the solid line, 114 the removal profile (per microsecond) of the tool 8 when the rotation axis 112 of the tool 8 is perpendicular to the surface of the workpiece 5. As shown, because there is no relative translation movement between the tool and the workpiece at the centre of the area of contact, the removal rate at the centre is zero. However, by tilting the toolhead so that it rotates at an angle θ to the surface normal, the resulting removal profile does not have this zero removal rate at the centre, as illustrated by the dashed profile 116 shown in FIG. 2c.

As those skilled in the art will appreciate, the removal profiles illustrated in FIG. 2c represent cross-sections of three-dimensional removal profiles defined, in part, by the three-dimensional shape of the tool 8. Additionally, in this embodiment, because a deformable sheet of polishing material 110 is used to perform the polishing, the removal profile within the contact area is unlikely to be symmetric and will depend on the surface geometry of the workpiece 5 within the contact area.

Figure 2D:
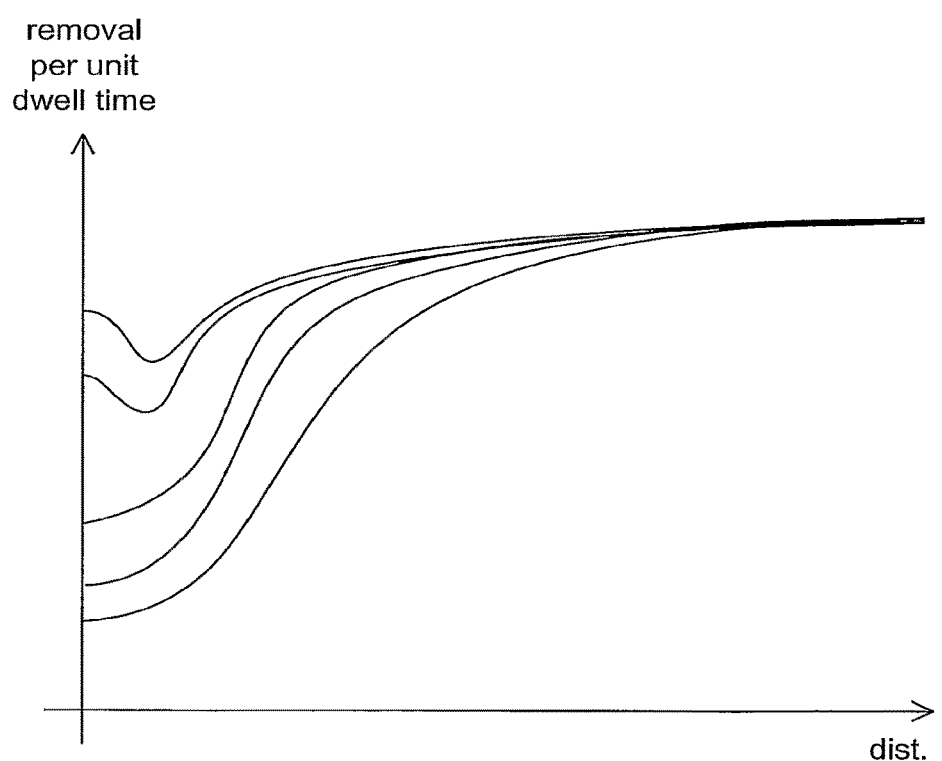

In this embodiment, the polishing machine can vary the internal pressure within the tool 8 in order to control the pressure with which the polishing machine applies the polishing material 110 to the surface of the workpiece 5. The removal profile for the tool will also depend upon this pressure. FIG. 2d schematically illustrates a cross-section of a number of different removal profiles that the tool 8 can have, depending on the various controllable characteristics of the tool 8. As shown in FIG. 2d, the removal profiles illustrate the amount of material removed per unit dwell time. The actual removal within the contact area is given by multiplying the removal profile by the time that the tool 8 works the surface with that profile (the dwell time). By varying the dwell times and the removal profile of the tool 8 (i.e. the controllable characteristics of the tool 8) as the tool 8 is passed over the workpiece 5, the desired polishing is achieved.

A description will now be given of the way in which the computer control system 9 determines how to control the various drive actuators of the polishing machine to achieve the desired polishing effect along the pseudo-random tool-path. A description will then be given of various ways in which pseudo-random tool-paths can be defined.

Computer Control System

As discussed above, in this embodiment, the tool-path (i.e. the path along which the tool 8 moves relative to the workpiece 5) is fixed. The main purpose of the computer control system 9 is therefore to select the optimum control parameters to use to control the tool 8 at different positions along the defined tool-path, in order to remove the required amount of material from the workpiece 5 to obtain a workpiece having the desired surface profile. FIG. 3 is a block diagram illustrating the main components of the computer control system 9 used in this embodiment to control the tool 8. As shown, the computer control system 9 includes a tool-path effect processor 301 which receives:

(1) surface model data 303 defining the surface profile of the workpiece 5 to be worked;

(2) tool-path data 305 which defines the path over the workpiece 5 along which the tool 8 will pass; and (3) influence function data 307 which defines various influence functions (representing the above-described removal profiles) that the tool 8 can have on the workpiece 5, depending on the values of the controlled variables.

As illustrated in FIG. 3, the function of the tool-path effect processor 301 is to process this received data and to generate therefrom an influence matrix 309 which defines all the different possible influences that the tool 8 can have over the worksurface 5 depending on the values of the controlled parameters, for the given tool-path and workpiece profile.

The computer control system 9 also includes an optimiser 311 which is designed to determine an optimised actuator parameter matrix 313 which defines the optimum control parameters to be used to control the polishing apparatus as the tool 8 passes along the defined tool-path. In this embodiment, the optimiser 311 calculates the optimised actuator parameter matrix 311 by performing an iterative optimisation routine based on:

i) target profile data 315 which defines the target or desired profile for the workpiece 5;

ii) a measured profile of the current workpiece 5 obtained from a profile measurement sensor 317; and iii) the influence matrix 309 calculated by the tool-path effect processor 301.

As shown in FIG. 3, the optimised actuator parameter matrix 313 calculated by the optimiser 311 is passed to a tool controller 315 which also receives the tool-path data 305. The tool controller 315 uses this data to generate the necessary control signals for application to the tool actuators 317 used to drive the components of the polishing machine to cause the tool 8 to remove the required material from the workpiece 5 to generate a workpiece 5 having the desired (or target) profile. As shown, the tool controller 315 also generates the control signals based on sensor signals obtained from tool sensors 319 used to sense various parameters (e.g. pressures, positions etc.) of the polishing machine.

Tool-Path Effect Processor

A more detailed description will now be given of the way in which the tool-path effect processor 301 calculates the above-described influence matrix 309. As discussed above, the tool-path effect processor 301 receives the surface model data 303 defining the surface profile of the workpiece 5 and tool-path data 305 which defines the path along which the tool 8 will pass relative to the surface of the workpiece 5. FIG. 4a schematically illustrates the surface of the workpiece 5 as defined by the surface model data 303 and the tool-path 401 defined by the tool-path data 305. As shown in FIG. 4a, the tool-path 401 follows a non-periodic (in this case pseudo-random) pattern over the entire surface of the workpiece 5. In this embodiment, the tool-path data 305 includes a sequence of (x,y,z) coordinates (tool-path points) along the tool-path 401. Some of these tool-path points ($TP_i$) are shown in FIG. 4a at the left-hand end of the tool-path 401.

In this embodiment, the surface model data 303 defines the three-dimensional surface of the workpiece 5. The surface model data 303 also includes the (x,y,z) coordinates of a number of mesh points ($MP_j$) which divide the surface into a number of triangular areas. Part of the mesh for the surface profile shown in FIG. 4a is shown in FIG. 4b. In this embodiment, the mesh is a by-product of the modelling technique used to model the surface of the workpiece 5—Delaunay triangulation, which is a well-known technique used in computer modelling. In this embodiment, the surface model data 303 also includes data defining an area that is associated with each of the mesh points. These areas are also a by-product of the modelling technique used to model the surface of the workpiece and are defined by the Voronoi diagram associated with the Delaunay triangulation. FIG. 4c diagrammatically illustrates the area $A_{MP2}$ that is associated with mesh point $MP_2$. A similar area will be defined within the surface model data 303 for each of the mesh points.

FIG. 4b also shows part of the tool-path 401 and illustrates (by the circle 403) the contact area that the tool 8 will have on the surface of the workpiece 5 when it is brought into contact and centred over the first tool-path point ($TP_1$). As discussed above, the tool 8 will perform polishing of the surface of the workpiece 5 within this contact area 403.

The purpose of the tool-path effect processor 301 is to consider what polishing effects (or influence) the tool 8 can have within the contact area 403 as the area 403 moves when the tool 8 is moved along the tool-path 401. Clearly, it is not practical to consider the influence of the tool 8 on the surface 5 at all points within the circle 403 and for all positions along the tool-path 401. Therefore, the tool-path effect processor 301 only considers the influence that the tool 8 can have on the worksurface at the mesh points ($MP_j$) which lie within the contact area 403 when the contact area 403 is centred on each of the tool-path points ($TP_i$) along the tool-path 401. To do this, the tool-path effect processor 301 considers the various different removal profiles that the tool 8 can have, which profiles are represented by a number of influence functions defined by the influence function data 307. As those skilled in the art will appreciate, there are an infinite number of different removal profiles that the tool 8 can have, depending on the controllable characteristics of the tool 8 and on the surface profile of the workpiece 5. The influence functions defined by the influence function data 307 is a representative sample of the possible removal profiles. The result of this processing by the tool-path effect processor 301 is the above-described influence matrix 309 which defines, for each tool-path point ($TP_i$) and each influence function profile, the influence (material removal per unit dwell time) that the tool 8 will have at the mesh points in the local vicinity of that tool-path point.

FIG. 5 is a flowchart illustrating in more detail the processing steps carried out by the tool-path effect processor 301. As shown, in step s1, the tool-path effect processor 301 initialises a loop pointer, i, associated with the tool-path points (TP) defined by the tool-path data 305 and a loop pointer, k, associated with the different influence functions defined by the influence function data 307. After these loop pointers have been initialised, the processing proceeds to step s3 where the tool-path effect processor 301 calculates the normal, curvature and tangent of the surface of the workpiece 5 at the current tool-path point ($TP_i$) using the surface model data 303. At step s3, the tool-path effect processor 301 also uses the calculated normal, curvature and tangent to deform the boundary of the contact area 403 for the current influence function (identified by the loop pointer k).

The processing then proceeds to step s5, where the tool-path effect processor 301 centres the thus-deformed contact area 403 on the current tool-path point ($TP_i$) identified by the loop pointer i. The processing then proceeds to step s7 where the tool-path effect processor 301 identifies the mesh points which lie within the thus positioned contact area 403. For the contact area 403 shown in FIG. 4b, the mesh points that would be identified in step s7 are: $MP_2$, $MP_3$, $MP_{89}$ and $MP_{123}$.

The processing then proceeds to step s9 where the tool-path effect processor 301 determines, for each of the mesh points identified in step s7, the amount of material that will be removed per unit dwell time. The way in which the tool-path effect processor 301 makes this determination will be explained with reference to FIG. 6. In particular, FIG. 6 shows the $k^{th}$ influence function defined in the influence function data 307. When determining the removal per unit dwell time for a mesh point, the tool-path effect processor 301 initially determines the distance (d) and direction of the current mesh point ($MP_j$) from the current tool-path point ($TP_i$). The tool-path effect processor 301 then uses this distance and direction to identify the part of the current influence function which corresponds to the area ($A_{mpj}$) associated with the current mesh point. The tool-path effect processor 301 then calculates the volume under the identified part of the current influence function. FIG. 6 illustrates the volume 601 under the influence function that is calculated in this way. The tool-path effect processor 301 then divides this volume 601 by the area ($A_{mpj}$) associated with the mesh point ($MP_j$) to determine an average removal per unit dwell time (in this embodiment per microsecond), $h_{i,j,k}$, for the current influence function (k).

The values thus determined are then stored in the influence matrix 309. FIG. 7 illustrates the form of the influence matrix 309 generated in the above manner. As shown, the influence matrix 309 is a three-dimensional matrix storing average removals per unit dwell time ($h_{i,j,k}$) at the mesh points positioned around each of the tool-path points for all the different influence functions defined by the influence function data 307.

After step s9, the processing proceeds to step s11 where the tool-path effect processor 301 increments the value of the pointer (i) associated with the tool-path points. In step s13, the tool-path effect processor 301 determines whether or not all of the tool-path points have been processed in the above manner, by comparing the value of the pointer (i) with the total number of tool-paths points defined in the tool-path data 305 (as defined by the variable $TP_{MAX}$). If all the tool-path points have not been processed in the above way, then the processing returns to step s3 where the same influence function is deformed and repositioned over the next tool-path point and the above process is repeated.

Once all of the tool-path points have been processed in the above way for the current influence function, the processing proceeds to step s15 where the tool-path effect processor 301 resets the pointer (i) associated with the tool-path points and increments the pointer (k) associated with the influence functions. In step s17, the tool-path effect processor 301 determines whether or not the above processing has been carried out for all of the possible influence functions defined in the influence function data 307. As shown, this is achieved by comparing the value of the loop pointer k with a variable $K_{MAX}$ which defines the total number of influence functions defined in the influence function data 307. If there are further influence functions to be processed, then the processing returns to step s3 where the above processing is repeated for the next influence function. Otherwise, the processing proceeds to step s19 where the tool-path effect processor 301 stores the generated influence matrix 309 for use by the optimiser 311. The processing then ends.

Optimiser

FIG. 8 is a block diagram illustrating the main components of the optimiser 311 used in this embodiment. As shown, the optimiser 311 includes an optimiser engine 801 which carries out an iterative optimisation routine to determine the optimum actuator parameter values to be used at each tool-path point along the tool-path 401.

Based on a current actuator parameter matrix 803, a matrix combiner 805 combines the information from this parameter matrix with the influence matrix 309 calculated by the tool-path effect processor 301, to determine a removal map 807 defining the amount of material that will be removed at the mesh points ($mp_j$) as the tool 8 passes along the defined tool-path 401. In effect, therefore, the current actuator parameter matrix 803 identifies, for each tool-path point, the influence function (k) that will be used at that point and the dwell time for that point.

FIG. 9 schematically illustrates the form of the current actuator parameter matrix 803. As shown, the parameter matrix 803 includes a set of tool parameters associated with each tool-path point (TP). The parameters include the dwell time, the spot size (which defines the nominal size of the contact area 403), the pressure applied to the tool 8, the value of the above-described angle θ etc.

When combining the current actuator parameter matrix 803 with the influence matrix 309, the matrix combiner 805 uses the tool parameters for a current tool-path point ($TP_i$) to identify the influence function (k) for those parameter values. As those skilled in the art will appreciate, the actuator parameter values defined in the current actuator parameter matrix 803 for a tool-path point may not exactly correspond to one of the influence functions defined by the influence function data 307 (which are only a representative sample of all possible influence functions). In this case, the matrix combiner 805 interpolates the appropriate figures in the influence matrix 309 to determine the appropriate removals per unit dwell time. The matrix combiner 805 then multiplies the average removals per unit dwell time stored in the influence matrix 309 (or derived therefrom) with the dwell time for the current tool-path point defined by the current actuator parameter matrix 803, to give an estimated value for the removal at each of the mesh points when the tool 8 is centred on the current tool-path point ($TP_i$).

For example, for the actuator parameter matrix 803 illustrated in FIG. 9a and for the first tool-path point ($TP_1$) the matrix combiner 805 would use the spot size (3.5), pressure (1), value of θ(5°) etc. to identify the corresponding influence function corresponding to those parameters. Assuming for illustration that these actuator parameter values correspond to the $k^{th}$ influence function, then the matrix combiner 805 looks up the influence matrix 309 to identify the mesh points stored for the current tool-path point for the $k^{th}$ influence function. In this example, the matrix combiner 805 would identify mesh points $MP_2$, $MP_3$, $MP_{89}$ and $MP_{123}$. The matrix combiner 805 then calculates the expected removals at these mesh points by multiplying the removal per unit dwell time values ($h_{i,j,k}$) stored in the influence matrix 309 for these mesh points with the dwell time defined for the first tool-path point ($TP_1$). In this case, the matrix combiner 805 would calculate the following expected removals:

$h_{1,2,k} \times 1.2$ for mesh point $MP_2$
$h_{1,3,k} \times 1.2$ for mesh point $MP_3$
$h_{1,89,k} \times 1.2$ for mesh point $MP_{89}$
$h_{1,123,k} \times 1.2$ for mesh point $MP_{123}$ The matrix combiner 805 performs a similar combination of the data from these two matrices for all of the tool-path points ($TP_i$). The matrix combiner 805 then adds together all of the estimated removals that are obtained in respect of the same mesh point, to give a final estimated removal value for each mesh point. In particular, as can be seen from FIG. 7, the mesh point $MP_{89}$ appears in the influence matrix 309 under tool-path point $TP_1$ and under tool-path point $TP_2$. Therefore, when the influence matrix 309 is combined with the current actuator parameter matrix 803, a removal value will be calculated for mesh point $MP_{89}$ associated with tool-path point $TP_1$ and another removal value will be calculated for the same mesh point that is associated with tool-path point $TP_2$. These two removals are then added together (together with any other removal values for mesh point $MP_{89}$) to give the total removal for mesh point $MP_{89}$.

FIG. 10 schematically illustrates the form of the final removal map 807 that is calculated by the matrix combiner 805 as a result of the above calculations. As shown, the removal map 807 comprises a removal depth (in this embodiment in micrometers) associated with each mesh point. This removal map 807 identifies an estimated amount of material that will be removed by the tool 8 at the mesh points, if the tool is made to follow the tool-path 401 (defined by the tool-path data 305) whilst using the actuator parameter values defined in the current actuator parameter matrix 803.

As shown in FIG. 8, in this embodiment, the calculated removal map 807 is subtracted from a target removal map 809 which defines the amount of material that is actually desired to be removed from the workpiece at the mesh points, in order to form a workpiece having the desired (or target) surface profile. (As shown in FIG. 8, the target removal map 809 is calculated by subtracting the measured surface profile 811 of the workpiece 5 from the target surface profile 315.) The resulting error map 815 is then fed back into the optimiser engine 801 which uses the values in the error map 815 to update the values in the current actuator parameter matrix 803. The above processing is then repeated using the updated current actuator parameter matrix 803 until the optimiser engine 801 determines that the optimisation process has fulfilled a predetermined convergence criterion. At this stage, the optimisation is complete and the optimiser engine 801 outputs the optimised actuator parameter matrix 313 for use by the tool controller 315 in controlling the driving and polishing of the tool 8 over the workpiece 5.

SECOND EMBODIMENT

In the first embodiment described above, the surface model data 303 modelled the surface of the workpiece 5 to be worked in a three-dimensional, XYZ, coordinate space. Similarly, the tool-path data 305 (which represents the path over the workpiece 5 along which the tool 8 is to pass) also represented the tool-path 401 in three-dimensional, XYZ, coordinate space. In this second embodiment, the surface model data 303 represents the surface of the workpiece 5 to be worked using two-dimensional (bivarate) parametric curves and in particular using non-uniform rational B-splines (NURBS). Additionally, in this embodiment, the tool-path data 305 also represents the tool-path 401 using such non-uniform rational B-splines. The advantage of using NURBS to represent the surface of the workpiece 5 and to represent the tool-path 401 is that it reduces the complexity of the surface modelling and the complexity in defining the tool-path 401 as they are defined in a two-dimensional, UV, coordinate space. The way in which NURBS and other similar parametric modelling techniques can be used to model surfaces and curves can be found in the second edition of the standard textbook entitled "Computer Graphics Principles and Practice" by Foley et al. and in particular in chapter 11 thereof.

As will be apparent to those skilled in the art of surface modelling using NURBS, the surface of the workpiece 5 is represented by parametric curves and a plurality of control points (and knots) whose positions in the UV space define the contours of the surface. For most surfaces being modelled, the control points will be non-uniformly distributed within the UV space, with more control points being provided in the regions associated with more complex parts of the surface being modelled. In this embodiment, the positions of mesh points that are used in the above-described processing of the first embodiment, are determined by transforming the UV coordinates of these control points (and knots) into corresponding XYZ coordinates using the NURBS parametric polynomials.

FIG. 11 schematically illustrates the workpiece 1101 represented in the NURBS UV space and showing a non-uniform grid 1103 on which the control points ($CP_j$) are located. FIG. 11 also illustrates the tool-path 1102 when represented in the NURBS UV space. As will be apparent to those skilled in the art familiar with NURBS, the path 1102 will also be represented by a two-dimensional array of control points (not shown), some of which may also be control points that define the surface profile of the workpiece 5. These control points for the path 1102 define a connected sequence of spline segments which together form the 2D path 1102. The tool-path points ($TP_i$) used in the above optimisation process are then determined from sample points ($SP_i$) taken along these spline segments. The positions of these sample points on the spline segments are chosen so that when the sample points ($SP_i$) are transformed back into three-dimensional, XYZ, space using the NURBS polynomials, the resulting tool-path points ($TP_i$) are approximately evenly spaced from each other along the tool-path 401.

As was described above, during the calculations performed by the tool-path effect processor 301, a volume under each influence function was calculated for each mesh point and this volume was then divided by an area associated with the mesh point. In the first embodiment, the area was defined by the Voronoi diagram associated with the Delaunay triangulation of the workpiece surface. In this embodiment, the areas associated with the mesh points are defined by a second two-dimensional grid of grid points (defined in NURBS UV space) which is offset from the first grid 1103. This is illustrated in FIG. 12. In particular, FIG. 12 shows some of the control points $CP_i$ of the first grid 1103 as well as the second grid 1201 which defines the areas 1203 surrounding the control points of the first grid 1103. This is illustrated in FIG. 12 by the shaded area 1203 in which control point $CP_1$ is located. As those skilled in the art will appreciate, the positions of the grid points (in UV space) which define the second grid 1201 and which define the areas 1203 around the control points ($CP_i$) also have to be transformed into XYZ space in order that the correct area in XYZ space can be calculated and used in the above tool effect calculations.

Tool-Path Generation

There are various ways in which the tool-path data 305 can be generated for use in the above embodiments. The main criterion is that the tool-path 401 should follow the surface of the workpiece 5. This is preferably done by calculating the positions of the above-described tool-path points and by defining a straight line or a curved path between successive tool-path points or by finding a best fit curve to those points.

FIG. 13 is a block diagram illustrating a tool-path generator 1301 which forms part of the polishing machine shown in FIG. 1 and which is used to generate the above-described tool-path data 305 using the surface model data 303, rules stored in a rules database 1303 and a random number generator 1305. In operation, the tool-path generator 1301 identifies an initial tool-path point on the surface of the workpiece 5 to be worked. The tool-path generator 1301 uses rules within the rules database 1303 to identify an appropriate starting point. For example, the rules database 1303 may define that the initial tool-path point should be located in a certain position or area of the workpiece 5. The tool-path generator 1301 then identifies the position of the next tool-path point, again referring to rules in the rules database 1303. For example, the rules database 1303 may define that the tool-path generator should identify the position of a subsequent tool-path point by randomly choosing a direction to travel from a current tool-path point. In this case, the tool-path generator 1301 uses the random number generator 1305 to make this random determination of the direction to be travelled.

In order to avoid a tool-path 401 which requires many different changes in direction of the tool 8, the rules database 1303 also preferably contains rules limiting the frequency with which the tool-path generator 1301 should change direction. As those skilled in the art will appreciate, this random selection of the direction to travel may result in the tool-path generator 1301 identifying positions that do not lie on the surface of the workpiece 5. In this case, the identified point in 3D space can be projected onto the surface in order to identify a corresponding tool-path point on the surface. The tool-path generator 1301 continues in this manner either for a predetermined number of steps or until it has defined tool-path data 305 which sufficiently covers the surface of the worksurface 5.

As those skilled in the art will appreciate, various different types of rules may be stored in the rules database 1303 in order to control the generation of the tool-path data 305 by the tool-path generator 1301. For example, in addition to the rules discussed above, the rules database 1303 may include the following rules:

1) rules which define what to do when the tool-path approaches or encounters a boundary of the workpiece 5. For example, these rules may define that the tool-path should approach the boundary tangentially or at some predefined angle or range of angles or a probabilistically defined range of angles, in order to control the boundary conditions (edge effects). The tool-path may be constrained so that, from a tool-path point which is within a first predetermined distance of the workpiece boundary, the tool-path may not proceed in a direction within a predetermined angle range from the normal joining the workpiece boundary to that tool-path point. Likewise, the tool-path may be constrained so that, from a tool-path point on the workpiece boundary, the tool-path may proceed in a direction along the boundary, or in a direction away from the boundary and within a predetermined angle range from the normal to the workpiece boundary.
2) Rules which control the tool-path generator 1301 in order to limit the number of visits to each region of the workpiece 5. These rules may be dynamically adjusted depending on the workpiece 5 to be worked so that the number of visits allowed within each region of the workpiece can vary depending on the amount of material to be removed from those regions. In this way, regions of the workpiece 5 which require less polishing are allowed fewer visits whereas regions requiring more polishing are allowed more visits. As those skilled in the art will appreciate, to implement this rule, the tool-path generator 1301 will have to divide the worksurface into different regions and will have to keep track of when the tool-path enters and exits each region.
3) In addition to (2) above, the rules may also include rules to control the direction in which the tool-path takes so that the probability of visiting each region of the surface is a defined function of the amount of material to be removed in that region.
4) Rules which define the minimum turning radius for the tool-path (which is related to the maximum acceleration of the machine tool).
5) Rules which define that the minimum bend radius over a defined region of the surface is a deterministic or probabilistic function of the distance from a specified point in the surface (e.g. the centre). This rule ensures that the tool-path 401 follows a relatively smooth path over the worksurface.
6) Rules which define the number of times that the tool-path 401 can cross itself.

Various other rules will be apparent to those skilled in the art.

Instead of defining the tool-path 401 by identifying tool-path points within a three-dimensional space, the three-dimensional surface model data 303 may be projected down onto a two-dimensional plane (e.g. the X,Y plane) and then the tool-path defined on that plane and, once defined, projected back into three-dimensional space. This significantly simplifies the task of defining the tool-path as it is easier to define a tool-path in a two-dimensional plane rather than a three-dimensional space. However, with such a technique, the tool-paths become increasingly distorted as the surface slope increases and fails when the surface slope is perpendicular to the projection plane.

As described in the second embodiment, the tool-path may also be defined in the NURBS (or some other parametric) two-dimensional (UV) space. This is advantageous as it also reduces the problem to one of identifying a path in a two-dimensional plane and also avoids the problems associated with the above-described projections. In particular, when using NURBS to define the surface of the workpiece 5, points in the UV plane which lie within the boundary of the NURBS representation of the workpiece 5 will always lie on the actual surface of the object in XYZ coordinate space. The method also preferably uses an "artificial ant" algorithm to define the path in the UV plane.

The artificial ant algorithm may be used to define the positions of actual path sample points (SP) within the UV NURBS space, which are then connected together by a straight line or a curve or which are used in a curve fitting algorithm to find a curve that best fits the identified points. Alternatively, the artificial ant algorithm can be used to define the locations of control points which define the 2D path by spline segments such as NURBS. To carry out the artificial ant algorithm, the tool-path generator 1301 forms a grid or lattice of points over the representation of the workpiece 5 in the UV plane. The tool-path generator 1301 then starts at an initial lattice point and then randomly choose to move left, right, up or down on the lattice. This process continues until the tool-path generator 1301 has defined sufficient points which cover the surface of the workpiece 5.

In the case where the chosen lattice points represent sample points along the path (in UV space), the tool-path generator 1301 then converts these sample points into XYZ space to identify the XYZ tool-path points ($TP_i$). As those skilled in the art will appreciate, with this technique, in order to produce a relatively smooth tool-path the gridlines which form the lattice on which the artificial ant algorithm works will have to be closely spaced. This technique is therefore relatively time-consuming.

In the alternative case where the artificial ant algorithm defines the control points for splines, the gridlines do not have to be as closely spaced, although a non-uniform lattice may be preferable in order to ensure that sufficient control points are provided in parts of the workpiece which are geometrically complex or which require more polishing. Further, as those skilled in the art will appreciate, if the artificial ant algorithm is used to define control points in order to define the tool-path using splines, then the final sequence of spline segments that is calculated has to be sampled along its length and then those sample points converted into XYZ space to identify the XYZ tool-path points ($TP_i$).

It is not essential to define the tool-path 401 using some random walk or artificial ant algorithm in UV space. Instead, the path in UV space may be defined by providing a random distribution of control points used to define a sequence of spline segments over the portion of the UV plane corresponding to the surface of the workpiece 5. Alternatively, instead of being randomly distributed, the control points may be distributed in a more intelligent manner so that more control points are provided at any boundaries of the surface or at portions of the surface which require more polishing.

As a further alternative, adaptive isocurves may be used to define the path in the UV space. In particular, adaptive isocurves take advantage of the NURBS used to represent the surface to be polished. As discussed above, every point on the surface of the workpiece 5 is represented by two coordinates: u and v. Using the NURBS polynomials, a (u,v) coordinate can be converted into a corresponding three-dimensional coordinate (x,y,z). By keeping either u or v constant, a function plotted in UV space is a straight line. When this same function is expressed in three-dimensional coordinates, it becomes a curve along the surface. Therefore, calculations which would be very complicated in three-dimensional space become simple actions involving only straight lines in UV space. These functions are called isocurves.

The simplest way to make an isocurve would be to choose one coordinate (U or V) to be constant and to let the other coordinate run from its minimum to maximum value. The problem with using this method of defining isocurves becomes apparent when a hemisphere is considered. If u is chosen to be the coordinate which represents the direction of latitude on the hemisphere, then v is the direction of longitude. If two sets of isocurves are defined: one equally spaced in u and one equally spaced in v, then when these isocurves are translated into three dimensions onto the surface of the hemisphere, the lines of longitude will still be equally spaced at each point, however, the lines of latitude will be closer together near the pole than at the equator of the hemisphere. To solve this problem, a more sophisticated version of isocurves can be used, called adaptive isocurves. Instead of running from one edge of the surface to the other, adaptive isocurves start and stop so that every point on the surface is within a certain distance of one of these curves. In this case, every line of longitude on the hemisphere does not extend all the way to the pole.

These isocurves are produced recursively in the following manner. Initially, the algorithm starts with two isocurves defined in UV space at the opposite edges of the surface along lines where u or v is constant. The desired spacing between the curves in XYZ space is then defined, such as the radius of the polishing tool 8. The system then calculates the distance between these isocurves (in XYZ space) at every point along the curves. If this distance is ever greater than the specified spacing, a new isocurve (in UV space) is started at that point, halfway between the two starting isocurves. When the distance is less than or equal to the defined spacing, the new isocurve is stopped. The algorithm then starts over, adding new isocurves between all the existing isocurves until every point on the surface of the workpiece is within the defined spacing of at least one isocurve. The algorithm is then repeated keeping the other of the u or v coordinates constant, resulting in two sets of perpendicular isocurves.

As those skilled in the art will appreciate, by defining the adaptive isocurves using the tool radius for the spacing, every point on the surface of the workpiece 5 will be within reach of the tool 8 if it follows these isocurves.

An alternative method for creating a tool path that visits the entire surface of a part but has no periodic pattern is to create a maze pattern. The tool can be considered to be wandering through a maze that takes it over every point on the surface to be treated.

There are many types of mazes, and the type of maze that is the most useful in the present application is the unicursal maze. This type of maze has no dead ends, no crossings and no junctions, but is a single convoluted path leading from a start to a finish. Such mazes can be applied in polishing, to cause a tool to "wander" over the entire surface in a random path without ever crossing its past track. A unicursal maze pattern can be generated very quickly and scaled up or down to any size. In one embodiment, the first step in creating a unicursal maze tool path is to generate a maze. A second algorithm then solves that maze and that solution is used as the tool path.

A perfect maze can contain junctions, loops and dead ends. Its defining characteristic is that any point in the maze can be reached from any other point. To create a unicursal maze, we begin with a starting maze, which is a perfect maze having no loops.

The starting maze is converted into a unicursal maze by longitudinally dividing every passage, so that each passage becomes two adjacent passages, and every dead end becomes a u-turn.

A unicursal maze may be generated by first dividing the region to be treated into a matrix of square cells, or by first covering the region in hexagonal grid points. The effect of these two different starting geometries affects the appearance of the tool path patterns that result. The "packing density", which is the transverse spacing between adjacent stretches of the maze (and of the final tool path generated), depends on and can be set by, the size of the cells in the matrix, or the spacing between the hexagonal grid points. By varying the size of cells in the matrix, or varying the spacing between grid points, in predetermined regions of the area to be treated, the "packing density" of the tool path can be varied from one region to another of the area to be treated. In a particular embodiment, the size of cells in the matrix, or the spacing between grid points, may be reduced in regions adjacent the edge of the area to be treated, so that the "packing density" of the tool path is increased and adjacent stretches of the tool path are closer together in these regions.

Square Unicursal Maze Tool Path

This method for generating a tool path uses an algorithm that divides the region to be treated into a matrix of square cells. The size of the cells is set on the basis of the polishing influence function of the tool. The matrix may be defined so that the pattern that results in the end will have the same average spacing between neighbouring path sections as the raster or the spiral of a conventional polishing tool path.

After subdividing the surface, the next step is the generation of the starting maze. This may be done using the Aldous-Broder algorithm. Preferably, it starts in a corner cell and moves to a neighbouring cell at random, creating a step of the tool path. From there, it chooses another neighbouring cell and moves to that cell if it has not been previously visited, creating a second step. If every neighbour of a cell has been visited, the algorithm randomly jumps to another visited cell and again starts looking for unvisited neighbours. This creates a junction in the starting maze. When every cell of the surface has been visited at least once, the maze is complete.

The Aldous-Broder algorithm is not the fastest method for producing the starting maze, but it does have advantages, in that it can generate all possible mazes of a given size and does so with equal probability of producing any particular maze pattern. The maze produced is random, with no bias towards any direction.

The starting maze, which comprises passage cells and wall cells, is then converted into a unicursal maze in three operations. In the first operation, all passage cells are converted into a third type of cell called "inner-wall". In the second step, any wall cell now bordering an inner-wall cell is converted to a passage cell, creating a unicursal maze. In the third step inner-wall cells are re-labelled as wall cells.

This produces a unicursal maze pattern, but not a tool path. A maze-solving algorithm is used to solve the maze and store the solution as a list of coordinates. These coordinates are used as control points for a spline curve, and the spline curve is used as a tool path and is expressed in NURBS space with coordinates ranging from 0 to 1 in u and v.

Hexagonal Unicursal Maze Algorithm

The first step in creating the unicursal maze tool path using this method is the generation of a first hexagonal grid. The spacing of the grid is based on the spot size used for surface treatment. The spacing between adjacent stretches of the final tool path pattern is preferably equal to half the maximum width of the polishing influence function. This first grid should have a spacing equal to twice the maximum width of the polishing influence function, to make the final pattern density work out correctly.

A second hexagonal grid that is four times as dense as the first grid is then overlaid on the first grid. This second grid must extend beyond the first grid by one row in each direction, to allow room to build the final pattern.

Next a minimal spanning tree is generated using the Aldous-Broder method (Aldous, D., SIAM Journal on Discrete Mathematics, 1990). This spanning tree is a starting maze which connects all of the points in the first hexagonal grid.

To generate the spanning tree, a start point is chosen and all neighbouring points of the start point are identified. These neighbours can be found, for example by considering all points that lie within a distance equal to the grid spacing as neighbours. An unvisited neighbour is randomly chosen and the algorithm moves to that point, creating the first step of the maze. Neighbours are again identified, and an unvisited neighbour is randomly chosen and the algorithm moves to that point, creating the second step of the maze. As before, if all neighbours have been visited, the algorithm moves to a random visited point elsewhere in the grid, creating a junction. This process is repeated until every point in the large-scale first grid has been visited. For each step of the tree, the four fine-grid points of the second grid that the step passes through are identified. These points are saved in an array that holds the spanning tree pattern.

All points of the spanning tree pattern, and points of the fine grid pattern which are neighbours of points in the spanning tree pattern, are then identified as a group ("collected").

The points from this collected group which belong to the spanning tree are removed. The result is a unicursal maze pattern (Pullen, "Think Labyrinth" 2006), essentially a path which extends along one side of the spanning tree pattern.

As before, this pattern needs to be turned into a path made up of a list of coordinates using a maze-solving algorithm. A starting point is selected and marked as visited, then the neighbouring points in the pattern are identified, and the solver moves to the first unvisited neighbour.

This process is repeated until every point in the pattern has been visited, which brings the solver back to the starting point. These points are then used as control points to create a spline curve. This spline curve is output as the tool path.

The hexagonal unicursal maze tool path can be generated for any shape, including parts with interior holes, by setting out the hexagonal grids to correspond to the surface to be treated.

Tool-Path Selection

As those skilled in the art will appreciate, there are almost an infinite number of possible tool-paths 401 which can be generated for traversing the surface of the workpiece 5. Some of these tool-paths may not be efficient or may leave artefacts on the surface of the workpiece 5. However, hidden somewhere within all possible tool-paths, there will be one or more tool-paths which combine the ideal qualities of polishing results and efficiency. If one of these efficient tool-paths can be identified, then it will simplify the optimisation process discussed above and, in some cases, may remove the need for it altogether. A number of techniques which can be used to try to identify these efficient tool-paths will now be described.

Genetic Algorithm

The tool-paths can be considered to be "states" of a system, and the collection of all possible tool-paths is called the "state space". There are many artificial intelligence techniques devoted to searching such state spaces for optimal state solutions. One of these methods is the genetic algorithm, which can be described as searching the state space by randomly wandering through it. The inefficiency of this random wandering is greatly decreased by creating an entire population of candidate solutions which are considered in parallel. The algorithm narrows in on the best areas of the state space (i.e. the best solutions) by eliminating and replacing low quality candidate solutions.

Genetic algorithms model natural evolution by using a "survival of the fittest" philosophy. The algorithm begins with a population of candidate solutions. Each of these solutions is evaluated and the weakest solutions are eliminated. Characteristics of the best solutions are combined to replace the eliminated candidates. The process is repeated a number of times (or generations) until a solution is found which satisfies a predetermined criterion.

In the case of tool-path generation, the tool-path generator 1301 initially creates the population of candidate tool-paths (in this embodiment 100 candidate tool-paths). This is done firstly by dividing the surface of the workpiece 5 (in the UV plane) into pixels (using the above-described lattice) and then each candidate tool-path is created. The toolpath may be created by the unicursal maze methods, or by performing a random walk (controlled using the random number generator 1305) of 10,000 steps across these pixels on the workpiece surface. The system then calculates a "dwell time map" for the workpiece 5 which identifies, for each of the above pixels, the amount of time that the tool 8 should spend at the point in XYZ space corresponding to that pixel. The dwell time for each pixel depends on the amount of material to be removed and is calculated by considering the difference between the measured profile of the workpiece and the target profile of the workpiece. When calculating the dwell time for each pixel, the tool-path generator 1301 may assume that the polishing tool 8 has a constant average removal per unit dwell time.

The tool-path generator 1301 then calculates the velocity of the tool through each of the 10,000 steps for each candidate tool-path by averaging the dwell times at the starting and ending pixels and by dividing the length of the step (in XYZ space) by this time.

After creating the population, the tool-path generator 1301 evaluates each candidate tool-path. This evaluation is carried out, in this embodiment, using the above-described tool-path effect processor 301 and the optimiser 311. In particular, the tool-path generator 1301 passes the candidate tool-paths (once transformed into XYZ space) to the above-described tool-path effect processor 301 and the optimiser 311 so that the above-described optimisation process is run for each candidate tool-path. At the end of the optimisation, the optimiser 311 passes the final error map 815 for each candidate tool-path back to the tool-path generator 1301. The tool-path generator 1301 then compares these error maps to identify the tool-paths which produce the lowest errors. The tool-path generator 1301 also analyses the required velocity and acceleration of the tool 8 along each candidate tool-path. Based on the error maps and the velocity and acceleration required for each tool-path, the tool-path generator 1301 ranks the candidate tool-paths and eliminates the bottom half of the candidate tool-paths.

The tool-path generator 1301 then randomly pairs the remaining 50 candidate tool-paths. The tool-path generator 1301 then arbitrarily selects a step in each tool-path of each pair and then both tool-paths are "cut" at that point. This is schematically illustrated in FIG. 14*a* which shows a pair of candidate tool-paths 401-1 and 401-2 and illustrating the point 1401-1 and 1401-2 at which the two tool-paths are cut. The tool-path generator 1301 then splices together the left-hand portion of the first tool-path 401-1 with the right-hand portion of the second tool-path 401-2 and splices together the left-hand portion of the second tool-path 401-2 with the right-hand portion of the first tool-path 401-1, to thereby generate two new candidate tool-paths 401-3 and 401-4 as shown in FIG. 14*b*. This cutting and splicing is performed for each pair of candidate tool-paths. This cutting and splicing will therefore generate another 50 possible candidate tool-paths which are combined with the top 50 candidate tool-paths that were ranked, to create a new population of 100 candidate tool-paths. This whole process is then repeated a number of times (in this case 50). The tool-path generator 1301 then uses the best candidate tool-path to define the tool-path data 305 to be used to control the actual polishing of the workpiece 5.

Stipple Tool-Path Algorithm

A number of techniques have been described above for generating a pseudo-random tool-path which passes over substantially the whole of the worksurface 5. However, a pseudo-random tool-path which crosses itself introduces the further constraint that no matter how many times a path crosses the same point on the worksurface, the total amount of material removed at that point must equal the desired amount of material (as defined by the above-described error map). Therefore, if the tool-path crosses a point on the surface more than once, either the time that the tool spends at that point or the influence function (or both) must be controlled each time the tool passes over that point, so that the cumulative effect of the tool does not exceed the required treatment at that point. This may create an obstruction in producing a smooth tool-path where the velocity of the tool 8 is smoothly varied over the workpiece 5.

Additionally, the random tool-path must not contain instructions which would be impossible for the polishing machine to follow. In other words, the tool-path cannot include extreme changes in velocity and direction. For most workpieces 5, the difference in the amount of time that has to be spent in adjacent parts of the surface is not great. Therefore, if the dwell time at a crossing point is divided equally between the two parts of the tool-path, then as the polishing machine follows the path, it will suddenly be asked to pass through that crossing point very quickly compared to the speed at neighbouring pixels. Not only might the acceleration required be more than the polishing machine can carry out, this quick change in velocity will also result in a polishing artefact on the surface of the workpiece 5. Therefore, if the random path is allowed to wander across the surface of the workpiece long enough to produce reasonable removal results, the integrated effect of the splitting of the dwell times at the crossing points, results in a structure pattern which outlines the edges of the pixels on the workpiece defined by the dwell time map.

One way to deal with this problem is to avoid it entirely. The inventors have realised that they can do this by using techniques developed for the quilting industry. In particular, when a quilt is made, the top piece of the quilt is sewn to a backing piece of cloth with a layer of cotton batting sandwiched between them. A pattern is then stitched over the surface of the entire quilt to prevent the batting from bunching together and becoming lumpy. Quilters have developed a pattern for efficiently covering the entire quilt surface with a roughly equally-spaced amount of stitching called "stippling". The stippling is designed to cover the entire quilt using a continuous smooth path of stitches which never crosses itself. The inventors have realised that these stippling patterns have many characteristics which are desirable for machine tool purposes. In particular, they are pseudo-random, they never cross themselves, they are continuous and they define a smooth path. FIG. 15 schematically illustrates an example of a stippling pattern 1501.

As these stippling patterns are designed to be applied to a substantially planar object (the quilt), the same stippling pattern can be used to fill the area defined by the workpiece 5, for example, in the above-described NURBS UV space. Once defined in this way, the actual 3D tool-path can be identified by using the NURBS polynomials to transform the thus defined tool-path back into XYZ space.

The inventors have also realised that one problem with using the above stippling patterns for some workpieces 5 is that the density of the stippling pattern may not be enough to accomplish the required amount of polishing without making the stippling pattern over convoluted, resulting again in the problems of exceeding the polishing machine's acceleration limits. This problem can, however, be overcome by splitting the polishing process into several phases. FIG. 16 is a block diagram illustrating the main components of a tool-path generator 1601 which operates in this manner.

As shown, the tool-path generator 1601 includes a stippling pattern database 1603 which includes data defining a plurality of different stippling patterns (each similar to the one shown in FIG. 15). The tool-path generator 1601 also includes a removal map calculator 1605 which selects (preferably randomly) one of the stippling patterns from the stippling pattern database 1603 and uses it and the dwell time map 1607 for the workpiece 5 to be worked, to generate a predicted removal map 1609 which represents the predicted material removal by passing the tool 8 over the workpiece 5 using a tool-path corresponding to the selected stippling pattern. This predicted removal map 1509 is then subtracted from the target removal map 809 (obtained by subtracting the target surface profile for the workpiece 5 from the measured surface profile) to generate an error map 1511 identifying the residual material still to be removed. The removal map calculator 1505 then uses this error map to calculate a new dwell time map defining the time to be spent at each pixel on the surface in order to remove this residual material.

The removal map calculator 1605 then selects another stippling pattern from the stippling pattern database 1603 and uses it and the new dwell time map that has been calculated to generate a new predicted removal map 1609. This new predicted removal map 1609 is then subtracted from the target removal map 809 (which has been updated so that it is the same as the error map 1611 obtained from the first removal). This generates a new error map 1611 which is passed to the removal map calculator 1605 as before. Once the removal map calculator 1605 determines that the error map is sufficiently close to zero, the removal map calculator 1605 passes the tool-path data for the selected stippling patterns together with their associated dwell time maps to the tool controller 315 which uses this data to control the polishing machine to perform the actual polishing of the workpiece 5.

As those skilled in the art will appreciate, the removal map calculator 1605 may be arranged to simulate the effect of different combinations of stippling patterns to identify the most efficient combination of stippling patterns to be used for a given workpiece 5. In this way, the desired polishing can be achieved using the minimum number of stippling patterns and/or with a desired quality of polishing finish.

As a further alternative, when the removal map calculator 1605 selects a stippling pattern from the stippling pattern database 1503, it may modify the stippling pattern in order to make the tool-path defined thereby more efficient for the particular workpiece 5 to be worked. In particular, the dwell time map 1607 identifies the points on the surface of the workpiece at which the tool 8 should spend the most time. The removal map calculator 1505 can therefore use this information from the dwell time map to vary the density of the stippling pattern over the workpiece 5 so that, the greater the density, the more time is spent by the tool.

For example, if each stippling pattern 1501 is defined by a self-avoiding random walk defined on a lattice of points distributed over the surface of the workpiece (as represented in UV space or a projection), then the removal map calculator 1605 can vary the density of the stippling pattern by varying the density of this lattice, so that the gridlines of the lattice are closer together in areas which require more polishing and further apart elsewhere. The chosen walk sequence can then take place on this modified lattice. A smooth tool-path can then be defined using the visited points on the lattice as control points for spline segments which represent the tool-path (in UV space) in the manner described above.

Modifications and Alternatives

Although all of the embodiments described above have related to the operation of a polishing machine which removes material from the surface of a workpiece 5, the inventions described in the present application are also applicable to many other types of machine tools. For example, the inventions described above are applicable to machine tools which are used in any physical process that adds material to the surface of the workpiece 5, removes material from the surface of the workpiece 5 or modifies the surface (or a region under the surface) of the workpiece 5 in some way or to a tool-path that is used in any physical process which employs any combination of these effects. Processes which add material include those which apply a coating or a plating to the surface of the workpiece. Other processes which remove material from the surface of the workpiece include grinding, ion abrasion etc. and processes which modify the surface of the workpiece include hardening, ion implantation, radioactive bombardment etc. The above systems can be used in any process where there is a tool which is to be moved across the surface of a workpiece along a tool-path and where the tool has a time-dependent cumulative effect within a local area on or under the surface of the workpiece. In many applications, the tool will physically touch the surface of the workpiece, whereas in others it may provide the action at a distance from the surface (for example, a tool which outputs a laser beam onto the surface).

In the above embodiments, a tool-path was used which was non-periodic. The use of a non-periodic tool-path overcomes the problem associated with periodic tool-paths (such as rasters or spirals) in which periodic artefacts are left on the surface of the workpiece. The tool path may be defined so that, as the tool passes along the tool path over the surface to be worked, the transverse distance between any section of the tool-path and a neighbouring section beside it is made to lie within a predetermined range of distances. This range may be dependant on the "footprint" of the tool, and may be set so that a predetermined degree of overlap between the footprint of the tool as it passes along the first section of the tool-path and the footprint of the tool as it passes along the neighbouring section of the tool-path. Preferably a minimum degree of overlap is maintained, at all positions along the tool-path, to ensure treatment of all parts of the workpiece surface. In alternative embodiments, the tool path may be defined so that the transverse distance between neighbouring sections of the tool path is reduced at points along the path, and in a particular embodiment in regions adjacent the edge of the workpiece (or the edge of the area of the workpiece to be treated). This reduction in separation between neighbouring sections of the tool path may be accompanied by a reduction in the footprint of the tool used at these regions of the tool path.

In the first and second embodiments described above, a tool-path was defined in advance and then used in an optimisation process to determine the optimum control parameters for controlling the polishing machine. As those skilled in the art will appreciate, in an alternative embodiment, the tool-path may not be defined in advance and may also be optimised in the optimisation process. The advantage of this technique is that the optimisation process would determine the optimum tool-path as well as the optimum control parameters for the polishing machine. The disadvantage, however, is that the optimisation process would take significantly longer due to the increased calculations that would be required for the optimisation process to converge on an optimal tool-path. Further, in such an embodiment, the above-described influence matrix would have to be calculated at each step of the optimisation iteration as the optimiser changes the control parameters and the tool-path.

In the second embodiment described above, the tool-path was defined using NURBS. As those skilled in the art will appreciate, other types of splines can be used to define the tool-path. As mentioned above, the use of splines is advantageous because the control points which define the splines are defined in a two-dimensional coordinate space. Various other types of splines which can be used to represent the tool-path are described in chapter 11 of the above-mentioned textbook "Computer Graphics Principles and Practice" by Foley et al.

In the first embodiment, the tool-path was predefined and a tool-path effect processor was used to calculate the influence matrix 309. As those skilled in the art will appreciate, one of the advantages of pre-calculating the influence matrix in this way is that it speeds up the optimisation process performed by the optimiser 311. However, it is not essential to pre-calculate the influence matrix 309 in this way. For example, the optimiser 311 may be arranged to use the control parameters at each tool-path point to work out the exact influence that the tool 8 will have at that point and at the surrounding mesh points.

In the first embodiment described above, the tool controller 315 received sensor inputs from tool sensors 319. These sensors were provided to allow the tool controller 315 to control the actuators using conventional feedback control strategies. However, as those skilled in the art will appreciate, it is not essential for the tool controller 315 to use the feedback from the tool sensors 319.

In the first embodiment described above, the tool 8 had a deformable sheet of polishing material 110 attached to its end. As discussed above, this sheet deformed when the tool was brought down into contact with the surface to be polished. As a result of this deformation, the influence functions were also deformed based on the surface characteristics of the workpiece to be worked within the contact area. As those skilled in the art will appreciate, if the tool 8 has a rigid polishing head, then no deformation will occur and therefore, the tool-path effect processor 301 does not need to consider the deformation when the tool is brought down into contact with the surface.

In the first embodiment described above, the surface of the workpiece 5 was modelled using Delaunay triangulation techniques. As those skilled in the art will appreciate, other surface modelling techniques can be used, details of which can be found in any standard text.

In the first embodiment described above, the polishing machine used a polishing head having a sheet of polishing material attached to its end. As those skilled in the art will appreciate, during the polishing operation, water or other lubricant can be added to the surface in order to cool the machine tool. Further, abrasive particles may also be provided within the lubricant to help in the polishing process. For a more detailed description of the various techniques that can be used to polish a workpiece, the reader is referred to WO 00/32353.

In the first embodiment described above, during the calculation of the influence matrix, the tool-path effect processor 301 calculated a volume under each influence function based on an area associated with a mesh point under consideration. As those skilled in the art will appreciate, in a simpler embodiment, the tool-path effect processor may simply determine the value of the influence function at the mesh point. However, calculating the volume under the influence function is preferred as this generates a value representing the average removal in the area surrounding the mesh point.

In the above embodiment, the influence matrix 309 generated by the tool-path effect processor was a three-dimensional table representing the removal rates at each mesh point as the tool progresses along the tool-path. As those skilled in the art will appreciate, this information can be represented in a number of different data structures. It is not essential that it is represented in a three-dimensional matrix.

In the first embodiment, the optimiser subtracted the removal map obtained from the matrix combiner from the target removal map to define an error map that was used to drive the optimiser engine 801. As those skilled in the art will appreciate, the samples in the target removal map 809 may not correspond exactly to the positions of the mesh points. In this case, the optimiser would interpolate the samples within the target removal map to determine appropriate target removal values at each of the mesh points. The optimiser can then simply subtract the estimated removal from the target removal for each of the mesh points to generate the desired error map 815.

In the above embodiments, the workpiece to be worked by the machine tool was supported on a support which could move the tool relative to the tool head. As those skilled in the art will appreciate, the workpiece may be supported by a fixed support, in which case, the tool head will have to be mounted on an appropriate arm which can move in the required directions to follow the tool-path. Alternatively still, the tool head may be fixed and the support may be arranged to move the workpiece in all of the directions in order to allow the tool to follow the tool-path.

In the above embodiment, the influence functions were defined in terms of the amount of material removed per unit dwell time. As those skilled in the art will appreciate, instead of storing data in terms of such dwell times, the influence function data can be stored in terms of material removal per unit of speed of the tool 8. Both representations are equivalent as the speed is related to the dwell times by the distance between the points to which the dwell times relate.

The above-described embodiments relate to methods in which the amount of treatment to be delivered to the workpiece surface varies from place to place over the surface of the workpiece. Treatment may be concentrated at a particular area of the workpiece either by slowing down the tool in its movement along the tool path when the tool path enters an area requiring more concentrated treatment. The "packing density" of the tool path may be increased at areas requiring more concentrated treatment, by reducing the spacing between neighbouring stretches of the tool path in these areas. Concentrated treatment may also be delivered by increasing the influence function of the tool as it passes along the tool path in the area requiring concentrated treatment (for example by increasing the pressure of the tool against the workpiece to increase the rate of removal of material), while maintaining a constant tool speed along the path. It is further foreseen that combinations of two or more of these three techniques for providing concentrated treatment may be used together during the treatment process. Likewise, by speeding up the tool, increasing spacing between neighbouring stretches of the tool path, and/or decreasing the influence function of the tool a less concentrated treatment may be delivered at points along the tool path.

In an alternative embodiment of the surface treatment method, a tool path may be laid out on a surface to be treated, and the treatment tool may then be moved along the tool path over the surface, keeping the influence function of the tool constant. This treatment method finds utility in surface treatment processes where a uniform treatment is to be delivered to all parts of the surface, for example to change a surface characteristic without changing the overall shape or form of the surface.

Where the tool path is of a type having no crossing points, this will result in a uniform surface treatment to all sections of the surface, for example removing or applying a uniform layer of material from or to the surface. The result will be a workpiece having the same form as the original workpiece, but with a surface texture or other surface characteristic which has been uniformly modified by the passage of the surface treatment tool.

Where the tool path is of a type which has crossing points, such as may be generated by a "random walk" algorithm, an effective treatment of the surface may still be made provided that crossing points of the tool path are distributed substantially evenly over the surface, so that no localised concentration of crossing points occurs. If crossing points are concentrated in a particular area of the surface, then excessive treatment is delivered to that area, and for example excessive amounts of material may be removed or deposited such that the form of the surface is in fact altered.

In treatment processes of this type, there is the requirement firstly to measure the surface to be treated, in order to generate a tool path which follows the measured surface. However, there is no need to generate coordinates of a target workpiece surface, nor an error map to quantify the differences between the actual surface of the workpiece and the target surface, so processing time is markedly reduced.

In the embodiments described above, various processes and algorithms are described. These processes and algorithms may be performed using dedicated hardware circuits but are preferably performed using software modules which control the operation of a programmable processor, such as a personal computer, workstation or the like. The software may be provided on a recording medium such as a CD-ROM or it may be provided on a carrier signal downloaded over a computer network (such as the Internet). The software may be provided in any computer language and in compiled or in uncompiled form.

What is claimed is:

1. An apparatus for performing a surface treatment on an area of a workpiece, the apparatus comprising:
   a surface treatment tool having a treatment footprint;
   a tool-path generator comprising:
   a memory configured to store surface model data defining a three-dimensional (3D) surface area of a workpiece to be worked;
   a rules database comprising a plurality of rules relating to tool-path generation; and
   a tool-path determiner configured to determine data representing a 3D tool-path along the 3D surface of the workpiece area to be worked in accordance with rules from said rules database, wherein said surface model data defines said surface in a two-dimensional (2D) projection and wherein said tool-path determiner is configured to determine data representing a 2D path within said 2D projection and is configured to project the data representing said 2D path into 3D to define said data representing said 3D tool-path; and
   means to move the surface treatment tool relative to the workpiece along the determined 3D tool path such that the footprint of the treatment tool passes over all points of the area.

2. An apparatus according to claim 1, wherein said surface model data is configured to define said surface using two-dimensional parametric polynomials, wherein said tool-path determiner is configured to determine data representing a 2D path within a 2D space of said parametric polynomials and is configured to use said parametric polynomials to convert said data representing said 2D path into said data representing said 3D tool-path.

3. An apparatus according to claim 2, wherein said tool-path determiner is configured to determine said data representing said 2D path using one or more predetermined stippling patterns.

4. An apparatus according to claim 2, wherein said tool-path determiner is configured to determine said data representative of said 2D path using adaptive isocurves in accordance with rules in said rules database.

5. An apparatus according to claim 2, wherein said tool-path determiner is configured to determine said data representative of said 2D path using a random walk algorithm in accordance with rules in said rules database.

6. An apparatus according to claim 2, wherein said tool-path determiner is configured to determine said data representative of said 2D path using an artificial ant algorithm in accordance with rules in said rules database.

7. An apparatus according to claim 2, wherein said tool-path determiner is configured to determine said data representative of said 2D path on the basis of a maze algorithm in accordance with rules in said rules database.

8. An apparatus according to claim 2, wherein said tool-path determiner is configured to determine said data representative of said 2D path using a genetic algorithm in accordance with rules in said rules database.

9. An apparatus according to claim 2, wherein said data representative of said 2D path comprises a sequence of 2D points and wherein the tool-path determiner is configured to determine said data representing said pseudo-random tool-path by converting said sequence of 2D points into 3D points using said parametric polynomials.

10. An apparatus according to claim 9, wherein said tool-path determiner is configured to determine lines and/or curves between successive 3D points obtained from said parametric polynomials to determine said data representing said 3D tool-path.

11. An apparatus according to claim 9, wherein said tool-path determiner is configured to fit a curve to said 3D points in order to determine said data representing said 3D tool-path.

12. An apparatus according to claim 2, wherein said tool-path determiner is configured to determine a sequence of points within said 2D space, which 2D points identify control points for a plurality of spline segments that define said 2D path.

13. An apparatus according to claim 12, wherein said surface model data represents said surface using two-dimensional non-uniform rational B-splines and wherein said control points are control points for a non-uniform rational B-spline.

14. An apparatus according to claim 2, wherein said data representative of said 2D path comprises 2D coordinate positions for a sequence of points randomly positioned within said 2D space.

15. An apparatus according to claim 2, wherein said tool-path determiner is configured to determine data representing said 2D path comprising a sequence of points positioned in said 2D space in accordance with a distribution function defined by rules in said rules database.

16. An apparatus according to claim 15, wherein said rules define a weighted distribution function which causes said tool-path determiner to determine more 2D points at positions in said 2D space corresponding to boundaries of said area of said workpiece.

17. An apparatus according to claim 2, wherein said surface model data includes data identifying an amount of work to be carried out on different parts of said area of said workpiece and wherein said tool-path determiner is configured to determine data representing said 2D path comprising a sequence of points distributed within said 2D space in dependence upon the amount of work to be carried out in the different parts of the area.

18. An apparatus according to claim 2, wherein said tool-path determiner is configured to determine data representative of a 2D path which does not cross itself within said 2D space.

19. An apparatus according to claim 2, wherein said tool-path determiner is configured to determine data representing said 2D path using a uniformly-spaced lattice of points within said 2D space.

20. An apparatus according to claim 2, wherein said tool-path determiner is configured to define said data representative of said 2D path using a lattice of points in which the spacing between lattice points depends on an amount of work to be performed in a corresponding portion of said surface.

21. An apparatus according to claim 2, wherein said tool-path determiner is configured to determine data representing a plurality of 2D paths and wherein said tool-path definer is configured to select one or more of said 2D paths in accordance with a predetermined selection process.

22. An apparatus according to claim 21, wherein said tool-path determiner is configured to select said one or more 2D paths using artificial intelligence techniques in accordance with rules in said rules database.

23. An apparatus according to claim 21, wherein said tool-path determiner is configured to evaluate estimated effects of a tool working said surface along tool-paths corresponding to each possible 2D path and configured to select one or more of said 2D paths on the basis of that evaluated estimated effects.

24. An apparatus according to claim 2, wherein said tool-path determiner is configured to determine data representing said 3D tool-path which comprises 3D coordinates of a sequence of points along said tool-path.

25. An apparatus according to claim 24, wherein said tool-path determiner is configured to determine lines and/or curves between successive points within said sequence of points in order determine said data representing said 3D tool-path.

26. An apparatus according to claim 24, wherein said tool-path determiner is configured to fit a curve to said sequence of points in order to determine said data representating said 3D tool-path.

27. An apparatus according to claim 1, wherein said tool-path determiner is configured to determine data representing a pseudo-random 3D tool-path.

28. An apparatus according to claim 1 wherein said 3D tool-path does not cross itself.

29. An apparatus according to claim 1, wherein said tool-path determiner is configured to determine data representing a pseudo-random tool-path in which the transverse distance between neighbouring stretches of the path is arranged to be within a predetermined range of distances.

30. An apparatus according to claim 1, wherein said tool-path determiner is configured to determine data representing a 3D tool-path in which the transverse distance between neighbouring stretches of the path is substantially the same for all or substantially all points on the path.

31. An apparatus according to claim 1, wherein the surface treatment tool is capable of working on or under the surface of a workpiece.

32. An apparatus according to claim 1, wherein the 3-D tool-path is arranged so that, from a tool-path point which is within a first predetermined distance of a boundary of the area, the tool-path may not proceed in a direction within a predetermined angular range from the normal joining the boundary to that tool-path point.

33. An apparatus according to claim 1, wherein the tool-path is arranged so that, from a tool-path point on a boundary of the area, the tool-path may only proceed in a direction away from the boundary and within a predetermined angular range from the normal to the workpiece boundary.

34. An apparatus according to claim 1 wherein said means to move the surface treatment tool relative to the workpiece comprises a controller configured to control relative movement between the workpiece and the tool to cause the tool to follow the 3-D tool-path across said surface of the workpiece to effect a time-dependent cumulative action on or under said surface.

35. An apparatus according to claim 34, wherein said controller is configured to control the values of one or more controllable parameters of the apparatus to control the treatment of the workpiece along said tool-path, to cause the apparatus to vary the treatment of said surface at different locations along said tool-path.

36. An apparatus according to claim 35, wherein the controller comprises an optimiser configured to optimise control parameters used to control the working of the workpiece along said tool-path.

37. An apparatus according to claim 36, wherein the surface treatment tool is a tool for removing material from the workpiece surface, and wherein said optimiser is configured to use data defining an influence function of the tool, and data defining a desired profile and a current profile of the surface of the workpiece.

38. An apparatus according to claim 37, wherein said controller is configured to determine dwell times or tool speeds for predetermined positions on said surface of the workpiece to provide a predicted removal profile and is configured to vary the dwell times or tool speeds and other controllable parameters of the tool using a numerical optimisation process to determine control parameters and dwell times or tool speeds along said tool path that will minimise an estimated error between said desired profile and the profile of the surface after said tool has performed said polishing or abrading along said tool path.

39. An apparatus according to claim 1, wherein said treatment comprises one or more of:
  the removal of material from the surface of said workpiece;
  abrading or polishing the workpiece;
  the addition of material to the surface of said workpiece; and
  the modification of the surface or a region under the surface of said workpiece.

40. A method for performing a surface treatment on an area of a workpiece by moving a surface treatment device having a treatment footprint over the area; the method comprising:
  generating a 3D tool-path which visits all points of the area, in a tool-path generator comprising:
  a memory configured to store surface model data defining a three-dimensional (3D) surface of the area to be worked;
  a rules database comprising a plurality of rules relating to tool-path generation; and
  a tool-path determiner configured to determine data representing a 3D tool path along the surface of the area of the workpiece to be worked in accordance with rules from said rules database, wherein said surface model data defines said surface in a two-dimensional (2D) projection and wherein said tool-path determiner is configured to determine data representing a 2D path within said 2D projection and is configured to project the data representing said 2D path into 3D to define said data representing said 3D tool-path; and
  moving the surface treatment device along the 3D tool-path such that the footprint of the treatment tool passes over all points of the area.

41. A method according to claim 40, wherein the path is a random or pseudo-random path.

42. A method according to claim 40, wherein the 3D tool-path visits all points of the area without visiting any point twice.

43. A method according to claim 40, wherein the transverse distance between neighbouring stretches of the 3D tool-path is arranged to be within a predetermined range of distances.

44. A method according to claim 40, wherein the 3D tool-path is arranged so that the transverse distance between neighbouring stretches of the path is substantially the same for all or substantially all points on the path.

45. A method of manufacturing a semiconductor device comprising shaping or treating a silicon wafer using a method according to claim 40, and manufacturing the semiconductor device from the shaped or treated wafer.

46. A method of manufacturing a display device comprising shaping or treating a screen component using a method according to claim 40, and including the screen component in the display device.

47. A method of manufacturing an optical device comprising shaping or treating an optical component using a method according to claim 40, and manufacturing the optical device using the shaped or treated optical component.

48. A method according to claim 47, wherein the optical component is a lens or a mirror.

* * * * *